United States Patent
Nammi et al.

(10) Patent No.: US 10,680,778 B2
(45) Date of Patent: Jun. 9, 2020

(54) REDUCING CONTROL CHANNEL OVERHEAD IN 5G OR OTHER NEXT GENERATION NETWORKS

(71) Applicant: AT&T INTELLECTUAL PROPERTY I, L.P., Atlanta, GA (US)

(72) Inventors: SaiRamesh Nammi, Austin, TX (US); Ralf Bendlin, Cedar Park, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/932,258

(22) Filed: Feb. 16, 2018

(65) Prior Publication Data
US 2019/0260547 A1 Aug. 22, 2019

(51) Int. Cl.
*H04W 28/04* (2009.01)
*H04L 5/00* (2006.01)
(Continued)

(52) U.S. Cl.
CPC .......... *H04L 5/0053* (2013.01); *H04L 1/0006* (2013.01); *H04L 1/1819* (2013.01);
(Continued)

(58) Field of Classification Search
CPC ... H04L 5/0053; H04L 5/0058; H04L 1/0006; H04L 1/1819; H04L 1/1825; H04W 84/042
(Continued)

(56) References Cited

U.S. PATENT DOCUMENTS

| 8,351,400 B2 | 1/2013 | Damnjanovic et al. |
| 9,294,233 B2 | 3/2016 | Michel et al. |

(Continued)

FOREIGN PATENT DOCUMENTS

| CN | 105897386 | 8/2016 |
| EP | 2056513 A2 | 5/2009 |

(Continued)

OTHER PUBLICATIONS

Sachin, K. R., et al. "A Review of Hybrid ARQ in 4G LTE," Department of Computer Science and Engineering, vol. 1, Issue 3, pp. 160-165 (2015).
(Continued)

*Primary Examiner* — Sai Ming Chan
(74) *Attorney, Agent, or Firm* — Amin, Turocy & Watson, LLP

(57) ABSTRACT

Controlling and reducing overhead in control channels in 5G or other next generation communication systems is provided herein. In connection with a data transmission between a device and a network node device, an overhead management component (OMC) can analyze one or more factors associated with the device, including speed or Doppler metric(s) of the device, type of service associated with the device, historical HARQ statistics for the device, configured threshold value for CSI estimation, device capability regarding redundancy version support, or another factor(s). Based on analysis results, OMC can determine whether to utilize a single redundancy version state or a multiple redundancy versions state. If the single redundancy version state is selected, OMC can generate control information that does not include redundancy version information, the control information being communicated via a control channel. OMC can communicate RRC signal to the device to indicate the determined redundancy version state.

20 Claims, 14 Drawing Sheets

(51) Int. Cl.
*H04L 1/00* (2006.01)
*H04L 1/18* (2006.01)
*H04W 84/04* (2009.01)
*H04W 28/02* (2009.01)
*H04B 7/00* (2006.01)

(52) U.S. Cl.
CPC .......... *H04L 1/1825* (2013.01); *H04L 5/0058* (2013.01); *H04B 7/00* (2013.01); *H04L 1/0015* (2013.01); *H04L 1/0028* (2013.01); *H04W 28/0226* (2013.01); *H04W 84/042* (2013.01)

(58) Field of Classification Search
USPC ........................................................ 370/329
See application file for complete search history.

(56) References Cited

U.S. PATENT DOCUMENTS

| | | | |
|---|---|---|---|
| 9,320,024 B2 | 4/2016 | Lindh et al. | |
| 9,392,595 B2 | 7/2016 | Guan et al. | |
| 9,456,440 B2 | 9/2016 | Ko et al. | |
| 9,615,247 B2 | 4/2017 | Niewczas et al. | |
| 9,912,504 B2 | 3/2018 | Krzymien et al. | |
| 2009/0238066 A1* | 9/2009 | Cheng | H04L 1/0067 370/216 |
| 2015/0029970 A1* | 1/2015 | Niewczas | H04L 1/0006 370/329 |
| 2017/0302493 A1* | 10/2017 | Yang | H04L 1/0029 |
| 2017/0310431 A1 | 10/2017 | Iyer et al. | |
| 2017/0324519 A1 | 11/2017 | Guo et al. | |
| 2018/0049097 A1 | 2/2018 | Chen et al. | |
| 2018/0070369 A1* | 3/2018 | Papasakellariou | H04B 7/024 |
| 2018/0109358 A1 | 4/2018 | Xing et al. | |
| 2018/0241502 A1* | 8/2018 | Beale | H04L 1/0015 |
| 2019/0081832 A1* | 3/2019 | Marinier | H04L 5/0007 |

FOREIGN PATENT DOCUMENTS

| | | |
|---|---|---|
| EP | 2629442 A1 | 8/2013 |
| WO | 2017050500 A1 | 3/2017 |

OTHER PUBLICATIONS

International Search Report and Written Opinion dated May 17, 2019 for PCT Application No. PCT/US2019/017309, 15 pages.

* cited by examiner

REDUCING CONTROL CHANNEL OVERHEAD IN 5G OR OTHER NEXT GENERATION NETWORKS

TECHNICAL FIELD

The subject disclosure relates generally to communications networks, and for example, to reducing control channel overhead in 5G or other next generation networks.

BACKGROUND

To meet the significant demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

The above-described description is merely intended to provide a contextual overview relating to communication networks, and is not intended to be exhaustive.

BRIEF DESCRIPTION OF THE DRAWINGS

Various non-limiting embodiments are further described with reference to the accompanying drawings in which.

DETAILED DESCRIPTION

Figure 1:
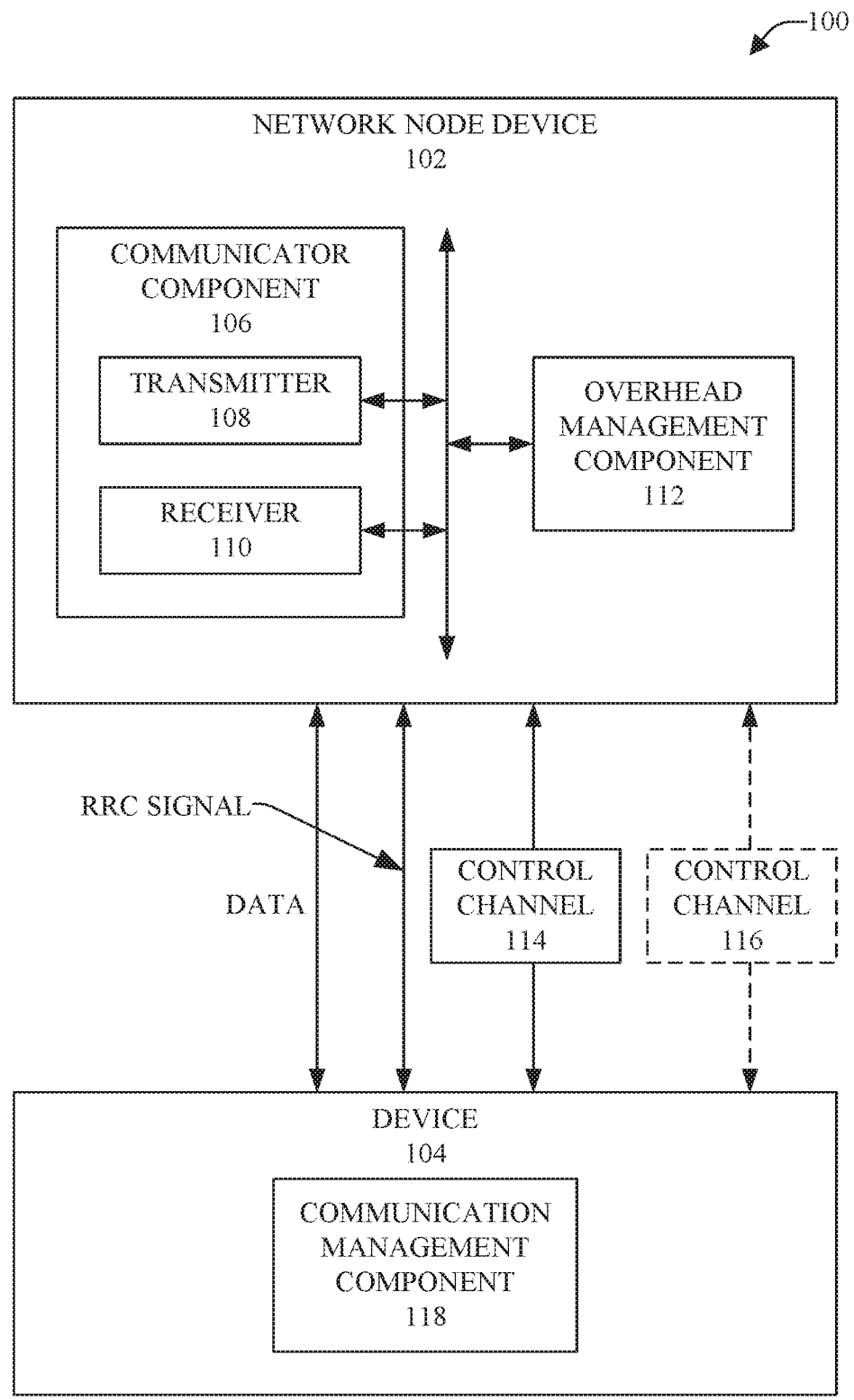
FIG. 1 illustrates a block diagram of an example, non-limiting system that can control overhead for a control channel in a communication network, in accordance with various aspects and embodiments of the disclosed subject matter.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular network environment or standard).

Discussed herein are various aspects that relate to reducing control channel overhead in 5G or other next generation networks. For example, as discussed herein Multiple Input Multiple Output (MIMO) performance can be improved in connection with data communications. In another example, the disclosed subject matter can enhance power efficiency, as the disclosed subject matter can reduce or minimize the amount of power utilized for transmitting control information via a control channel (e.g., a downlink control channel, or an uplink control channel). The power saved with respect to transmission of control information via the control channel can be utilized, for instance, for data transmission via the data traffic channel. As still another example, with improved data transmission, the disclosed subject matter can significantly improve the link and system throughput.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. Accordingly, systems, methods, and/or machine-readable storage media for reducing control channel overhead in 5G systems, and other next generation systems, can be desired. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

With further regard to MIMO technology, MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also will employ massive MIMO systems (e.g., hundreds of antennas at the transmitter side and receiver side). Typically, with a ($N_t$, $N_r$), where $N_t$ denotes the number of transmit antennas and $N_r$ denotes the number of receive antennas, the peak data rate can multiple with a factor of $N_t$ over single antenna systems in a rich scattering environment.

To meet the significant demand for data centric applications, 3GPP systems and systems that employ one or more aspects of the specifications of the 4G standard for wireless communications will be extended to a 5G standard for wireless communications. Some unique challenges exist to provide levels of service associated with forthcoming 5G, or other next generation, standards for wireless communication.

With regard to data communications in 5G (or other next generation) communication networks, accurate control channel reception can be desirable (e.g., needed) for decoding data traffic channels. As a result, it can be preferable to use more parity bits for encoding the control channel payload to improve accuracy and reliability of control information communicated via the control channel. However, increasing reliability by adding more parity bits can increase the signaling overhead of the control channel, and consequently, the number of resource elements utilized for data transmission will be less. This, in turn, can undesirably reduce the throughput and the capacity of the NR system. It can therefore be desirable to reduce signaling overhead of the control channels to facilitate enabling additional resources to be available for data transmission to achieve desirable (e.g., suitable, acceptable, or improved) data throughput and capacity of the NR system.

To that end, controlling and reducing overhead in control channels in 5G or other next generation communication systems is disclosed herein. The disclosed subject matter can employ efficient mechanisms and techniques for transmitting control information (e.g., downlink control information, uplink control information) using a reduced amount of overhead, as compared to other techniques for communicating data.

In connection with a data transmission between a device (e.g., communication device) and a network node device (e.g., base station), an overhead management component can determine a redundancy version state of a set (e.g., group) of redundancy version states that is to be utilized in connection with the data transmission based at least in part on one or more characteristics associated with the device associated with (e.g., communicatively connected to) a communication network via the network node device. The set of redundancy version states can comprise, for example, a single redundancy version state that can be associated with utilization of a single redundancy version (e.g., a single redundancy version value) in connection with the data transmission, and a multiple redundancy versions state that can be associated with utilization of multiple redundancy versions (e.g., multiple redundancy version values) in connection with the data transmission.

To facilitate determining the redundancy version state to employ, the overhead management component can analyze one or more characteristics or factors associated with the device, including speed or Doppler metric(s) of the device, type of service associated with the device, historical HARQ statistics for the device, configured threshold value for CSI estimation, device capability regarding redundancy version support, and/or another factor(s). Based at least in part on the results of the analysis, the overhead management component can determine whether to utilize the single redundancy version state or the multiple redundancy versions state, in accordance with defined overhead management criteria.

If the single redundancy version state is determined and selected by the overhead management component, the overhead management component can generate control information that does not include redundancy version information, wherein the control information can be communicated to the device via a control channel (e.g., a downlink control channel). For instance, when the single redundancy version state is selected, the overhead management component can employ a control channel structure that does not include a field for redundancy version. By not including a field for redundancy version in the control channel, and by not including redundancy version information in the control information, the overhead management component can reduce the amount of overhead (e.g., reduce the amount of control information) for the control channel.

If the multiple redundancy versions state is determined and selected by the overhead management component, the overhead management component can generate control information that does include redundancy version information, wherein the control information can be communicated to the device via the control channel. For example, when the multiple redundancy versions state is selected, the overhead management component can employ a control channel structure that does include a field for redundancy version.

In response to determining the redundancy version state to employ for the data transmission (and prior to communicating the control information via the control channel), the overhead management component can communicate an appropriate (e.g., corresponding) control signal, such as a radio resource control (RRC) signal, to the device to indicate the determined redundancy version state to use for the data transmission between the device and the network node device. For instance, if the single redundancy version state is determined and selected by the overhead management component, the overhead management component can generate a first type (e.g., single state) of control signal, which can relate and correspond to the single redundancy version state, and can communicate the first type of control signal to the device to facilitate indicating, to the device, that a single redundancy version is to be utilized for the data transmission, and also can indicate that no redundancy version information will be included in the control information communicated via the control channel in connection with the data transmission.

If the multiple redundancy versions state is determined and selected by the overhead management component, the overhead management component can generate a second type (e.g., multiple state) of control signal, which can relate and correspond to the multiple redundancy versions state, and can communicate the second type of control signal to the device to facilitate indicating, to the device, that multiple redundancy versions are to be utilized for the data transmission, and also can indicate that redundancy version information will be included in the control information communicated via the control channel in connection with the data transmission.

The disclosed subject matter, employing the overhead management component and techniques disclosed herein, can reduce the amount of overhead for a control channel (e.g., reduce the amount of control information communicated via the control channel) in connection with data transmissions, and can enhance power efficiency, as the disclosed subject matter can reduce or minimize the amount of power utilized for transmitting control information via the control channel (e.g., a downlink control channel, or an uplink control channel). The power saved with respect to transmission of control information via the control channel can be utilized, for instance, for transmission of data via the data traffic channel. As still another example, with improved data transmission, the disclosed subject matter can significantly improve the link and system throughput for the communication network.

These and other aspects and embodiments of the disclosed subject matter will now be described with respect to the drawings.

FIG. 1 illustrates a block diagram of an example, non-limiting system 100 that can control overhead for a control channel in a communication network, in accordance with various aspects and embodiments of the disclosed subject matter. The system 100 can comprise a set of network nodes, such as network node device 102, that can be part of the communication network to facilitate communication of information between devices (e.g., communication device), such as, for example, device 104, that can be associated with (e.g., communicatively connected to) the communication network. In some embodiments, the network node device 102 can be a base station or other type of network node (e.g., radio network node) that can be associated with (e.g., communicatively connected to) and serve the device 104 (as depicted), or can be connected to another network node that can be connected to and communication with the device 104. The communication network, including the network node device 102, can employ MIMO technology to facilitate data communications between devices (e.g., network node device 102, device 104, . . . ) in the communication network.

As used herein, the terms "network node device" and "network device" can be interchangeable with (or include) a network, a network controller or any number of other network components. Further, as utilized herein, the non-limiting term radio network node, or network node (e.g., network device, network node device) can be used herein to refer to any type of network node serving communications devices and/or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices also can comprise multiple antennas for performing various transmission operations (e.g., MIMO operations). A network node can comprise a cabinet and other protected enclosures, an antenna mast, and actual antennas. Network devices can serve several cells, also called sectors, depending on the configuration and type of antenna. Examples of network nodes or radio network nodes (e.g., the network node device 102) can include but are not limited to: NodeB devices, base station (BS) devices, access point (AP) devices, TRPs, and radio access network (RAN) devices. The network nodes also can include multi-standard radio (MSR) radio node devices, comprising: an MSR BS, a gNodeB, an eNode B, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like.

The device 104 also can be referred to as a mobile device, communication device, or mobile communication device. The term "mobile device" can be interchangeable with (or include) a user equipment (UE) or other terminology. Mobile device (or user equipment) can refer to any type of wireless device that can communicate with a radio network node in a cellular or mobile communication system. Examples of mobile devices can include, but are not limited to, a target device, a device to device (D2D) UE, a machine type UE or a UE capable of machine to machine (M2M) communication, a Personal Digital Assistant (PDA), a tablet or pad (e.g., an electronic tablet or pad), a mobile terminal, a cellular and/or smart phone, a computer (e.g., a laptop embedded equipment (LEE), a laptop mounted equipment (LME), or other type of computer), a dongle (e.g., a Universal Serial Bus (USB) dongle), an electronic gaming device, electronic eyeglasses, headwear, or bodywear (e.g., electronic eyeglasses, headwear, or bodywear having wireless communication functionality), a device associated or integrated with a vehicle, and so on.

It is noted that the various aspects of the disclosed subject matter described herein can be applicable to single carrier as well as to multicarrier (MC) or carrier aggregation (CA) operation of the mobile device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data plus speech is simultaneously scheduled).

The network node device 102 can comprise a communicator component 106 that can include a transmitter component 108 and a receiver component 110, wherein the transmitter component 108 can communicate information to other devices, such as the device 104, and wherein the receiver component 110 can receive information from other devices, such as the device 104. The communicator component 106 also can comprise an overhead management component 112 that can control overhead in a control channel 114 (e.g., downlink control channel) associated with the transmitter component 108 and/or a control channel 116 (e.g., uplink control channel) associated with the receiver component 110, in accordance with defined overhead management criteria. For instance, the overhead management component 112 can determine instances where control information can be reduced, for example, by not including redundancy version information (e.g., redundancy version value) in the control information being communicated via the control channel 114 (or control channel 116), with respect to data communications between the network node device 102 and the device 104, in accordance with the defined overhead management criteria, as more fully described herein. The overhead management component 112 also can determine other instances where it can be desirable to include redundancy version information in the control information being communicated via the control channel 114 (or control channel 116) with respect to data communications between the network node device 102 and the device 104, in accordance with the defined overhead management criteria, as more fully described herein.

It is to be appreciated and understood that, while certain aspects and embodiments are disclosed herein with regard to downlink data transmissions for MIMO systems, the same principle, and same or similar techniques, of the disclosed subject matter can be applicable to uplink data transmissions and systems, and side link data transmissions and systems.

In connection with, for example, a downlink data transmission, the network node device 102 can communicate cell specific or UE specific reference signals to the device 104. The device 104 can analyze the cell specific or UE specific reference signals, and can determine (e.g., compute) channel estimates and parameters for use in channel state information (CSI) reporting in connection with the downlink data transmission based at least in part on the results of analyzing the cell specific or UE specific reference signals and/or other information. The device 104 can generate the CSI report, which can comprise, for example, a channel quality indicator (CQI), a precoding matrix index (PMI), rank information (RI), CSI-RS resource indicator, and/or beam specific information (e.g., beam indicator). Upon request from the network (e.g., the network node device 102 or other network node) aperiodically or per periodic reporting, the device 104 can communicate the CSI report to the network node device 102 via a feedback channel.

A network scheduler (not shown) of or associated with the network node device 102 can analyze and use the information in the CSI report and/or other information to determine and select parameters for scheduling (e.g., scheduling of transmission of data) for the device 104, based at least in part on the results of analyzing the CSI report and/or the other information. The parameters determined for downlink transmission can comprise, for example, modulation and coding scheme (MCS), power, physical resource blocks (PRBs), and/or other desired parameters, as more fully described herein. These parameters (e.g., scheduling parameters) can be part of the control information (e.g., downlink control information (DCI)) that can be provided (e.g., communicated) to the device 104 to facilitate scheduling and execution of the data transmission for the device 104.

In connection with generating the control information, to facilitate controlling and/or reducing overhead for the control channel 114 (e.g., downlink control channel), the overhead management component 112 can determine a redundancy version state of a set of redundancy version states that is to be utilized in connection with the data transmission based at least in part on one or more characteristics or factors associated with the device associated with (e.g., communicatively connected to) a communication network via the network node device. The set of redundancy version states can comprise, for example, a single redundancy version state, which can be associated with utilization of a single redundancy version (e.g., a single redundancy version value) in connection with the data transmission, and a multiple redundancy versions state that can be associated with utilization of multiple redundancy versions (e.g., multiple redundancy version values) in connection with the data transmission.

To facilitate determining the redundancy version state to employ, the overhead management component 112 can analyze one or more characteristics or factors associated with the device, including a speed or Doppler metric(s) of the device, a type of service associated with the device, historical HARQ statistics for the device, a configured threshold value for CSI estimation, device capability regarding redundancy version support, and/or another factor(s).

As disclosed, one performance criteria (e.g., one characteristic or factor) for determining between the respective redundancy version states, and the respective HARQ techniques associated therewith, can be to obtain the speed or Doppler metric of the device 104. The overhead management component 112, or another component of or associated with the network node device 102, can obtain or determine the speed metric and/or Doppler metric for the device 104. If the speed of the device 104 is static or substantially static (e.g., is not varying in a substantial amount), there can be a relatively high probability that the transmission pass rate is high, that is, the majority of packets pass in the first transmission (e.g., the first transmission with the redundancy version (RV) value of RV0). This can indicate that it may not be necessary to indicate the redundancy version explicitly as the network node device 102 and the device 104 can have the common understanding that the first transmission is always RV0.

Accordingly, the overhead management component 112 (or another network component) can determine the speed metric or Doppler metric of the device 104 based at least in part on the result of analyzing information (e.g., speed or Doppler related information) relating to the device 104. If the overhead management component 112 determines that the speed metric or Doppler metric is static or at least substantially static, the overhead management component 112 can determine that the single redundancy version state is to be employed for the data transmission, as opposed to the multiple redundancy versions state, or at least determine that such analysis results indicate that the single redundancy version state is to be employed for the data transmission (e.g., wherein further analysis of other characteristics, factors, or performance criteria can be performed), in accordance with the defined overhead management criteria.

If the overhead management component 112 determines that the speed metric or Doppler metric is not desirably (e.g., suitably, acceptably) static or substantially static, the overhead management component 112 can determine that the multiple redundancy versions state is to be employed for the data transmission, as opposed to the single redundancy version state, or at least can determine that such analysis results indicate that the multiple redundancy versions state is to be employed for the data transmission (e.g., wherein further analysis of other characteristics, factors, or performance criteria can be performed), in accordance with the defined overhead management criteria.

Another performance criteria (e.g., another characteristic or factor) for determining between the respective redundancy version states, and the respective HARQ techniques associated therewith, can be the type of service(s) or application(s) utilized with respect to the device 104. 5G systems can support a number of different types of services, including enhanced mobile broadband (eMBB), ultra reliable low latency communication (URLLC), and massive machine type of communication (mMTC) services, applications, and systems. For URLLC applications, the reliability with reduced latency can be relatively significant (e.g., most or relatively important), while for mMTC, coverage can be relatively significant. Accordingly, the overhead management component 112 determine which type(s) of service or application(s) is being employed in connection with the device 104. Based at least in part on the type(s) or application(s) being employed, the overhead management component 112 can determine which of the redundancy version states to utilize for the data transmission with respect to the device 104.

For example, for URLLC and/or mMTC services or applications, the overhead management component 112 can determine that the single redundancy version state is to be used for the control channel 114 for the data transmission, or at least can determine that the employment of URLLC and/or mMTC services or applications with respect to the device 104 indicates that the single redundancy version state is to be used for the control channel 114 for the data transmission (e.g., wherein further analysis of other characteristics, factors, or performance criteria can be performed), in accordance with the defined overhead management criteria. Use of the single redundancy version for the control channel in connection with the use of URLLC and/or mMTC services or applications can desirably reduce latency and overhead (e.g., overhead for the control channel 114).

For the eMBB service or application, the overhead management component 112 can determine that the multiple redundancy versions state is to be used for the control channel 114 for the data transmission, or at least can determine that the employment of the eMBB service or application with respect to the device 104 indicates that the multiple redundancy versions state is to be used for the control channel 114 for the data transmission (e.g., wherein further analysis of other characteristics, factors, or performance criteria can be performed), in accordance with the defined overhead management criteria.

Another performance criteria (e.g., another characteristic or factor) for determining between the respective redundancy version states, and the respective HARQ techniques associated therewith, can be previous (e.g., historical) HARQ statistics associated with the device 104 over a period of time. The overhead management component 112 can analyze the previous HARQ statistics associated with the device 104 for a desired (e.g., defined) period of time to determine whether the device 104 utilizes (e.g., typically or often utilizes or requires) multiple re-transmissions of data or not. Based at least in part on the results of analyzing the previous HARQ statistics, if the overhead management component 112 determines that the device 104 desirably (e.g., suitably, acceptably) does not utilize (e.g., require) multiple re-transmission of data to accomplish (e.g., perform or complete) a data transmission (e.g., the device 104 accomplishes or typically accomplishes data transmissions with one or two transmissions, as opposed to using multiple re-transmissions), the overhead management component 112 can determine that it can be appropriate (e.g., suitable) and desirable (e.g., acceptable, or optimal) to utilize the single redundancy version state and associated format (e.g., associated single RV control channel format) for the control channel 114 for the data transmission, or at least can determine that such analysis results indicate that it can be appropriate (e.g., suitable) and desirable (e.g., acceptable, or optimal) to utilize the single redundancy version state and format for the control channel 114 for the data transmission (e.g., wherein further analysis of other characteristics, factors, or performance criteria can be performed), in accordance with the defined overhead management criteria. When the single redundancy version is employed, the use of the single redundancy version for the control channel 114 can desirably reduce latency and can desirably reduce overhead for the control channel 114.

If, however, based at least in part on the results of analyzing the previous HARQ statistics, the overhead management component 112 determines that the device 104 undesirably (e.g., unsuitably, unacceptably) utilizes (e.g., requires) multiple re-transmission of data to accomplish (e.g., perform or complete) a data transmission, the overhead management component 112 can determine that it can be appropriate (e.g., suitable) and desirable (e.g., acceptable, or optimal) to utilize the multiple redundancy versions state and format (e.g., associated multiple RV control channel format) for the control channel 114 in connection with the data transmission, or at least can determine that such analysis results indicate that it can be appropriate (e.g., suitable) and desirable (e.g., acceptable, or optimal) to utilize the multiple redundancy versions state and format for the control channel 114 in connection with the data transmission (e.g., wherein further analysis of other characteristics, factors, or performance criteria can be performed), in accordance with the defined overhead management criteria.

Still another performance criteria (e.g., another characteristic or factor) for determining between the respective redundancy version states, and the respective HARQ techniques associated therewith, can be the configured threshold for CSI estimation. In 5G NR, the network node device 102 (or other network node) can indicate, to the device 104, a threshold value in percentage (or other type of threshold value) for estimating the CSI. The threshold value typically either can be 10% or 1% for FER. If the communication network (e.g., the network node device 102 of the network) selects 1% as the threshold value, there can be a relatively high probability that the data packets of the data transmission will suitably pass (e.g., without multiple re-transmissions). In such instances (e.g., where 1% or other desired value is used as the threshold value), the overhead management component 112 can determine that it can be appropriate (e.g., suitable) and desirable (e.g., acceptable, or sufficient, or optimal) to utilize the single redundancy version state and format for the control channel 114 in connection with the data transmission, or at least can determine that such analysis results indicate that it can be appropriate (e.g., suitable) and desirable (e.g., acceptable, or optimal) to utilize the single redundancy version state and format for the control channel 114 in connection with the data transmission (e.g., wherein further analysis of other characteristics, factors, or performance criteria can be performed), in accordance with the defined overhead management criteria. When the single redundancy version is employed, the use of the single redundancy version for the control channel 114 can desirably reduce signaling, latency, and/or can overhead for the control channel 114.

If, however, the communication network selects, for example, 10% for the threshold value (or another value that is determined to be undesirable (e.g., unsuitable) with respect to use of the single redundancy version and format), the overhead management component 112 can determine that the device 104 undesirably (e.g., unsuitably, unacceptably) utilizes (e.g., requires), or at least potentially may utilize, multiple re-transmission of data to accomplish (e.g., perform or complete) a data transmission. Accordingly, the overhead management component 112 can determine that it can be appropriate (e.g., suitable) and desirable (e.g., acceptable, or optimal) to utilize the multiple redundancy versions state and format for the control channel 114 in connection with the data transmission, or at least can determine that such analysis results indicate that it can be appropriate (e.g., suitable) and desirable (e.g., acceptable, or optimal) to utilize the multiple redundancy versions state and format for the control channel 114 in connection with the data transmission (e.g., wherein further analysis of other characteristics, factors, or performance criteria can be performed), in accordance with the defined overhead management criteria.

Yet another performance criteria (e.g., another characteristic or factor) that can be considered for determining between the respective redundancy version states, and the respective HARQ techniques associated therewith, can be the capability of the device 104. Some UEs can be capable of supporting the single redundancy version and multiple redundancy versions, whereas other UEs may only be capable of supporting the single redundancy version. For example, some lower cost UEs may only be capable of supporting the single redundancy version.

The device 104 can communicate a signal (e.g., a UE RV capability signal) to the network node device 102, wherein the signal can indicate whether the device 104 is capable of supporting both the single redundancy version and multiple redundancy versions, or is only be capable of supporting the single redundancy version. The overhead management component 112 can analyze the signal from the device 104. If, based at least in part on the analysis, the overhead management component 112 determines that the device 104 only supports the single redundancy version, the overhead management component 112 can determine that it can be desirable (e.g., suitable, acceptable, or optimal) to utilize the single redundancy version state and format for the control channel 114 in connection with the data transmission, in accordance with the defined overhead management criteria. When the single redundancy version is employed, the use of the single redundancy version for the control channel 114 can desirably reduce overhead for the control channel 114, for example.

If, however, based at least in part on the analysis of the signal (e.g., a UE RV capability signal), the overhead management component 112 determines that the device 104 is capable of supporting both the single redundancy version and multiple redundancy versions, the overhead management component 112 can determine that analysis of other characteristics, factors, or performance criteria relating to the device 104 can be performed to determine which redundancy version state and associated format to employ in connection with the data transmission, in accordance with the defined overhead management criteria.

Depending on the overhead management criteria, one characteristic, factor, or performance criterion, or two or more characteristics, factors, or performance criterions can be utilized and evaluated by the overhead management component 112 to determine which redundancy version state and associated format to employ in connection with data transmissions. In some embodiments, the overhead management component 112 can consider a particular characteristic(s), factor(s), or performance criterion(s) (e.g., type of service, or a configured threshold for CSI estimation) to be more significant or relevant, and/or can apply or give more weight (e.g., apply a desired weighting factor), when determining which redundancy version state and associated format to employ in connection with data transmissions, in accordance with the defined overhead management criteria.

In certain embodiments, the network node device 102 may use any or none of the techniques for transmitting downlink control channel when multiple FEC codes are used for data transmission. Also, it is noted that each of the disclosed techniques can depend, at least in part, on how the multiple FEC codes are configured.

Based at least in part on the results of the analysis of one or more of the characteristics, factors, or performance criteria, the overhead management component 112 can determine whether to utilize the single redundancy version state (and associated single RV control channel format) or the multiple redundancy versions state (and associated multiple RV control channel format) for the data transmission for the device 104, in accordance with the defined overhead management criteria.

Figure 2:
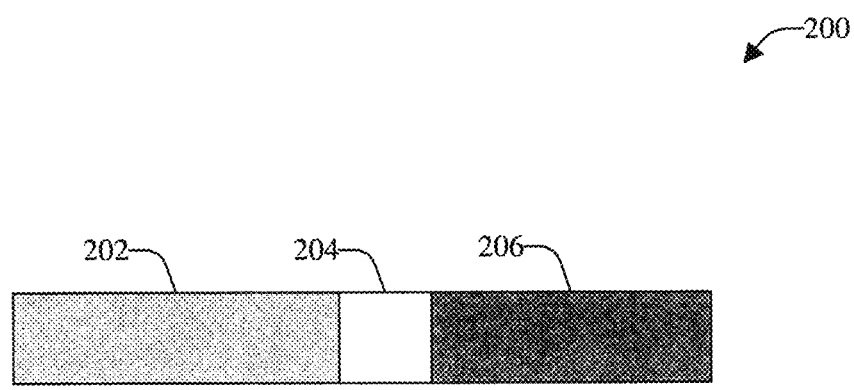
FIG. 2 depicts a block diagram of an example downlink control channel that includes a redundancy version field and can be employed when utilizing the multiple redundancy versions state, in accordance with various aspects and embodiments of the disclosed subject matter.
Figure 3:
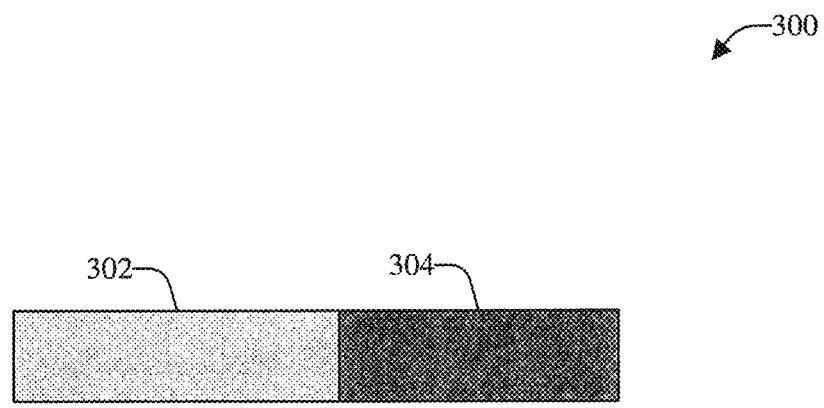
FIG. 3 presents a block diagram of an example downlink control channel 300 that does not include a redundancy version field or redundancy version information, with respect to codewords of a data transmission, and can be employed when utilizing the single redundancy version state, in accordance with various aspects and embodiments of the disclosed subject matter.

Referring briefly to FIGS. 2 and 3 (along with FIG. 1), FIG. 2 depicts a block diagram of an example downlink control channel 200 that includes a redundancy version field and can be employed when utilizing the multiple redundancy versions state, in accordance with various aspects and embodiments of the disclosed subject matter. FIG. 3 presents a block diagram of an example downlink control channel 300 that does not include a redundancy version field or redundancy version information, with respect to codewords of a data transmission, and can be employed when utilizing the single redundancy version state, in accordance with various aspects and embodiments of the disclosed subject matter.

As can be observed in the downlink control channel 200 of FIG. 2, the downlink control channel 200 can comprise various fields wherein respective control information can be inserted. The various fields can comprise, for example, a first field 202 wherein a first portion of the control information can be included (e.g., inserted), a second field 204 (e.g., an RV field) wherein redundancy version information can be included, and a third field 206 wherein another portion of the control information can be included.

As can be observed in the downlink control channel 300 of FIG. 3, the downlink control channel 300 can comprise various fields wherein respective control information can be inserted. The various fields can comprise, for example, a first field 302 wherein a first portion of the control information can be included (e.g., inserted), and a second field 304 wherein another (e.g., second) portion of the control information can be included. The downlink control channel 300 associated with the single redundancy version state, for use of only a single redundancy version value, can be structured to not include the RV field, as, since only a single redundancy version value is being used with the single redundancy version state, it can be unnecessary, redundant, and inefficient to communicate such redundancy version information to the device 104. Other aspects of the downlink control channel 200 of FIG. 2 and the downlink control channel 300 of FIG. 3 will be discussed elsewhere herein.

If, based at least in part on the results of the analysis of one or more of the characteristics, factors, or performance criteria, the overhead management component 112 determines that the single redundancy version state is to be selected and utilized for the data transmission, the overhead management component 112 can generate the control channel 114 to have a format or structure (e.g., single RV control channel format of downlink control channel 300) that does not include a field for redundancy version (e.g., does not include an RV field), and can generate control information, for communication via the control channel 114, that does not include redundancy version information (e.g., does not include a redundancy version value, such as RV0).

If, based at least in part on the results of the analysis of one or more of the characteristics, factors, or performance criteria, the overhead management component 112 determines that the multiple redundancy versions state is to be selected and utilized for the data transmission, the overhead management component 112 can generate the control channel 114 to have a format or structure (e.g., multiple RV control channel format of downlink control channel 200) that does include a field (e.g., RV field 204) for the redundancy version, and can generate control information that does include redundancy version information, which can be inserted in the field.

Prior to the network node device 102 communicating the control information to the device 104 via the control channel 114, the overhead management component 112 can generate an appropriate (e.g., corresponding) control signal (e.g., a higher layer or higher order signal or message), such as an RRC signal (e.g., RRC message), that corresponds to the determined (and selected) redundancy version state, and can communicate the appropriate control signal to the device 104 to indicate, to the device 104, the determined (and selected) redundancy version state to use for the data transmission between the device 104 and the network node device 102. For instance, if the single redundancy version state is determined and selected by the overhead management component 112, the overhead management component 112 can generate a first type (e.g., single RV state) of control signal, which can relate and correspond to the single redundancy version state, and can communicate the first type of control signal to the device 104 to facilitate indicating, to the device 104, that a single redundancy version is to be utilized for the data transmission, and also can indicate that no redundancy version information will be included in the control information communicated via the control channel 114 in connection with the data transmission.

If the multiple redundancy versions state is determined and selected by the overhead management component 112, the overhead management component 112 can generate a second type (e.g., multiple RV state) of control signal, which can relate and correspond to the multiple redundancy versions state, and can communicate the second type of control signal to the device 104 to facilitate indicating, to the device 104, that multiple redundancy versions are to be utilized for the data transmission, and also can indicate that redundancy version information will be included in the control information communicated via the control channel 114 in connection with the data transmission.

The device 104 can receive the control signal (e.g., RRC signal) from the network node device 102. The device 104 can comprise a communication management component 118 that can analyze the control signal to determine which redundancy version state of the set of redundancy version states is being utilized, and correspondingly, which control channel format for the control channel 114 is being utilized, in connection with the data transmission. If the control signal is the first type (e.g., single RV state) of control signal, the communication management component 118 can control operation of the device 104 to have the communication management component 118 and/or other components of the device 104 to process the control information communicated via the control channel 114 based at least in part on the single redundancy version state, and correspondingly, the control channel 114 not including an RV field or redundancy version information. If the control signal is the second type (e.g., multiple RV state) of control signal, the communication management component 118 can control operation of the device 104 to have the communication management component 118 and/or other components of the device 104 to process the control information communicated via the control channel 114 based at least in part on the multiple redundancy versions state, and correspondingly, the control channel 114 having an RV field and redundancy version information therein.

When the data transmission is being performed utilizing the single redundancy version, the network node device 102 can communicate the control information (having no redundancy version information) to the device 104 via the control channel (e.g., downlink control channel 114) having the single RV control channel format (e.g., the format of downlink control channel 300). By not including a field for the redundancy version in the control channel 114, and by not including redundancy version information in the control information, the overhead management component 112 can reduce the amount of overhead (e.g., reduce the amount of control information) for the control channel 114 in connection with the data transmission.

When the data transmission is being performed utilizing multiple redundancy versions, the network node device 102 can communicate the control information, comprising the redundancy version information, to the device 104 via the control channel (e.g., downlink control channel 114) having the multiple RV control channel format (e.g., the format of downlink control channel 200).

Based at least in part on (e.g., in accordance with) the control information communicated via the control channel 114, the data of the data transmission can be communicated between the network node device 102 and the device 104 via a data traffic communication channel.

As disclosed, the principles and techniques disclosed herein can be employed for uplink data transmissions, with regard to an uplink data transmission, the overhead management component 112 can determine which redundancy version state of the set of redundancy version states, and correspondingly, which control channel format, to utilize for the data transmission, employing the techniques and analyses described herein, in accordance with the defined overhead management criteria. The overhead management component 112 can communicate an appropriate (e.g., corresponding) control signal (e.g., RRC signal), which can correspond to the determined redundancy version state, to the device 104. The communication management component 118 of the device 104 can analyze the control signal to determine which redundancy version state of the set of redundancy version states, and which control channel format, to utilize for the data transmission. Based at least in part on the result of analyzing the received control signal, the communication management component 118 and/or other components of the device 104 can perform the uplink data transmission to transmit the data, in accordance with the determined redundancy version state and using the corresponding control channel format. For instance, in a single redundancy version state, the control channel will not include an RV field, and the control information will not include redundancy version information; and in a multiple redundancy versions state, the control channel will include an RV field, and the control information will include redundancy version information (e.g., in the RV field).

The disclosed subject matter, employing the overhead management component 112 and techniques disclosed herein, can reduce the amount of overhead for a control channel (e.g., reduce the amount of control information communicated via the control channel (e.g., downlink control channel 114 or uplink control channel 116)) in connection with data transmissions, and can enhance power efficiency, as the disclosed subject matter can reduce or minimize the amount of power utilized for transmitting control information via the control channel. The network node device 102 can utilize the power and other resources saved with respect to transmission of control information via the control channel, for example, for transmission of data via the data traffic channel. As still another example, with improved data transmission, the disclosed subject matter can significantly improve the link and system throughput for the communication network.

Figure 4:
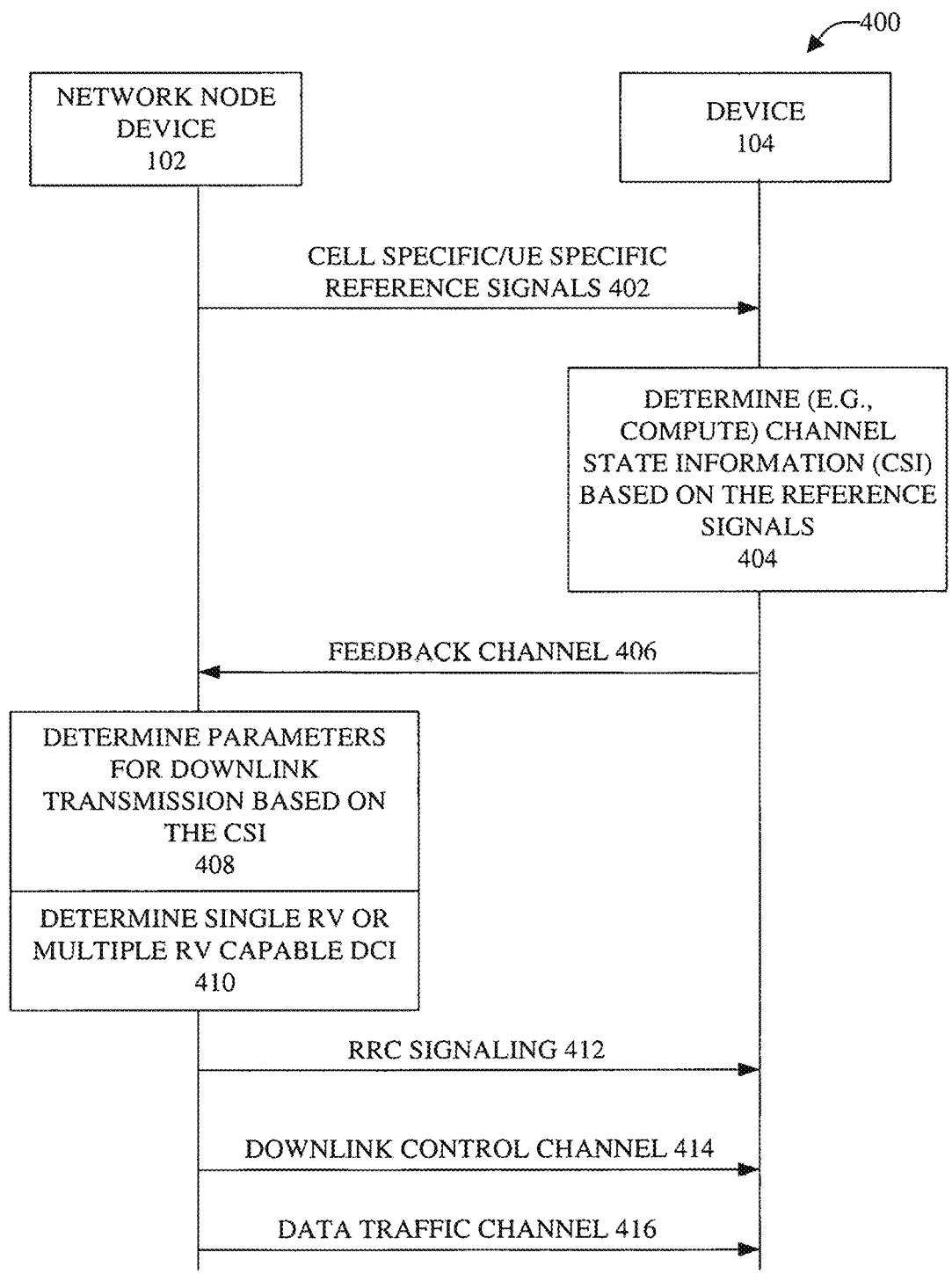
FIG. 4 illustrates a block diagram of an example, non-limiting message sequence flow chart for a downlink data transmission in 5G systems in accordance with one or more embodiments described herein.

FIG. 4 illustrates a block diagram of an example, non-limiting message sequence flow chart 400 for a downlink data transmission in 5G systems in accordance with one or more embodiments described herein. The non-limiting message sequence flow chart 400 can be utilized for new radio, as disclosed herein. As illustrated, the non-limiting message sequence flow chart 400 can represent the message sequence between the network node device 102 and the device 104.

In connection with, for example, a downlink data transmission, as indicated at reference numeral 402 of the message sequence flow chart 400, the network node device 102 can communicate cell specific or UE specific reference signals to the device 104. As indicated at reference numeral 404 of the message sequence flow chart 400, the device 104 can analyze the cell specific or UE specific reference signals, and can determine (e.g., compute) channel estimates and parameters for use in channel state information (CSI) reporting in connection with the downlink data transmission based at least in part on the results of analyzing the cell specific or UE specific reference signals and/or other information. The device 104 can generate the CSI report, which can comprise, for example, a channel quality indicator (CQI), a precoding matrix index (PMI), rank information (RI), CSI-RS resource indicator, and/or beam specific information (e.g., beam indicator). Upon request from the network (e.g., the network node device 102 or other network node) aperiodically or per periodic reporting, the device 104 can communicate the CSI report to the network node device 102 via a feedback channel, as indicated at reference numeral 406 of the message sequence flow chart 400.

As indicated at reference numeral 408 of the message sequence flow chart 400, a network scheduler of or associated with the network node device 102 can analyze and use the information in the CSI report and/or other information to determine and select parameters for scheduling (e.g., scheduling of transmission of data) for the device 104, based at least in part on the results of analyzing the CSI report and/or the other information. The parameters determined for downlink transmission can comprise, for example, modulation and coding scheme (MCS), power, physical resource blocks (PRBs), and/or other desired parameters, as more fully described herein. These parameters (e.g., scheduling parameters) can be part of the control information (e.g., downlink control information (DCI)) that can be provided (e.g., communicated) to the device 104 to facilitate scheduling and execution of the data transmission for the device 104.

As indicated at reference numeral 410 of the message sequence flow chart 400, in connection with generating the control information, to facilitate controlling and/or reducing overhead for the control channel 114 (e.g., downlink control channel), the overhead management component 112 of the network node device 102 can determine which redundancy version state of a set of redundancy version states (e.g., single redundancy version state, multiple redundancy version state) is to be utilized in connection with the data transmission, based at least in part on one or more characteristics or factors associated with the device 104, in accordance with the defined overhead management criteria, as more fully described herein. As indicated at reference numeral 412 of the message sequence flow chart 400, the network node device 102 can communicate a control signal (e.g., RRC signal) to the device 104 to indicate, to the device 104, which redundancy version state is being employed, and correspondingly, which control channel format is being employed, for the data transmission.

As indicated at reference numeral 414 of the message sequence flow chart 400, the control information (e.g., DCI) can be communicated via the control channel 114, which can have a control channel format that can correspond to the selected redundancy version state. As indicated at reference numeral 416 of the message sequence flow chart 400, the data of the data transmission can be communicated between the network node device 102 and the device 104 via a data traffic channel, in accordance with the control information.

With further regard to downlink reference signals, downlink reference signals can be predefined signals that can occupy specific resource elements within the downlink time-frequency grid. There are several types of downlink reference signals that can be transmitted in different ways and used for different purposes by the receiving terminal (e.g., receiving device 104). For example, there can be CSI reference signals (CSI-RS). CSI-RS can be specifically intended to be used by terminals (e.g., mobile devices) to acquire CSI and beam specific information (beam reference signal received power (RSRP)). In 5G, CSI-RS can be UE specific, so it can have a significantly lower time and/or frequency density.

As another example, there also can be demodulation reference signals (DM-RS). DM-RS also sometimes can be referred to as UE-specific reference signals, and such signals can be specifically intended to be used by terminals (e.g., mobile devices) for channel estimation for the data channel. The label "UE-specific" relates to the fact that each demodulation reference signal can be intended for channel estimation by a single terminal (e.g., device 104). That specific reference signal is then only transmitted within the resource blocks assigned for data traffic channel transmission to that particular terminal. Other than these reference signals, there also can be other reference signals, such as, for example, phase tracking and tracking and sounding reference signals (SRS) that can be used for various purposes.

As disclosed, the techniques of the disclosed subject matter also can be employed with regard to uplink control channel and uplink data transmissions. With regard to the uplink control channel, the uplink control channel can carry information regarding HARQ acknowledgement (HARQ-ACK) information that can correspond to the downlink data transmission, and CSI. The channel state information typically can comprise CSI-RS resource indicator (CRI), rank indicator (RI), channel quality indicator (CQI), precoding matrix indicator (PMI), and/or layer indicator, etc. The CSI can be divided into two categories. One can be for subband and the other can be for wideband. The configuration of subband or wideband CSI reporting can be performed through RRC signaling as part of the CSI reporting configuration. Table 1 illustrates the contents of CSI report for PMI format indicator=Wideband, CQI format indicator=wideband and for PMI format indicator=subband, and CQI format indicator=subband.

TABLE 1

Contents of CSI report for both wideband and side band

| PMI-FormatIndicator = widebandPMI and | PMI-FormatIndicator = subbandPMI or CQI-FormatIndicator = subbandCQI | | |
|---|---|---|---|
| CQI-FormatIndicator = | | CSI Part II | |
| widebandCQI | CSI Part I | wideband | Sideband |
| CRI | CRI | Wideband CQI for the second TB | Subband differential CQI for the second TB of all even subbands |
| Rank Indicator | Rank Indicator | PMI wideband (X1 and X2) | PMI subband information fields X$_2$ of all even subbands |

TABLE 1-continued

Contents of CSI report for both wideband and side band

| PMI-FormatIndicator = widebandPMI and | PMI-FormatIndicator = subbandPMI or CQI-FormatIndicator = subbandCQI | | |
|---|---|---|---|
| CQI-FormatIndicator = | | CSI Part II | |
| widebandCQI | CSI Part I | wideband | Sideband |
| Layer Indicator | Layer Indicator | — | Subband differential CQI for the second TB of all odd subbands |
| PMI wideband (X1 and X2) | Wideband CQI | — | PMI subband information fields X$_2$ of all odd subbands |
| Wideband CQI | Subband differential CQI for the first TB | — | — |

It is noted that, for NR, the subband can be defined according to the bandwidth part of the OFDM in terms of PRBs, as shown in Table 2. The subband configuration also can be performed through RRC signaling.

TABLE 2

Configurable subband sizes

| Carrier bandwidth part (PRBs) | Subband Size (PRBs) |
|---|---|
| <24 | N/A |
| 24-72 | 4, 8 |
| 73-144 | 8, 16 |
| 145-275 | 16, 32 |

With further regard to the downlink control channel and downlink control channel information, the downlink control channel (e.g., physical downlink control channel (PDCCH)) can carry information relating to the scheduling grants. Typically, this information can comprise a number of MIMO layers scheduled, transport block sizes, modulation for each codeword, parameters related to HARQ, and/or subband locations, etc. It is noted that, some DCI formats may not use or transmit all the information as shown above or otherwise described herein. In general, the contents of the downlink control channel can depend, at least in part, on the transmission mode and the DCI format.

Typically, all or a portion of the following information can be transmitted by means of the DCI format:

carrier indicator;

identifier for DCI formats;

bandwidth part indicator;

frequency domain resource assignment;

time domain resource assignment;

virtual resource block (VRB)-to-physical resource block (PRB) mapping flag;

PRB bundling size indicator;

rate matching indicator;

zero power (ZP) CSI-RS trigger;

modulation and coding scheme for each transport block (TB);

new data indicator for each TB;
redundancy version for each TB;
hybrid automatic repeat request (HARQ) process number;
downlink assignment index;
transmit power control (TPC) command for uplink control channel;
physical uplink control channel (PUCCH) resource indicator;
physical downlink shared channel (PDSCH)-to-HARQ feedback timing indicator;
antenna port(s);
transmission configuration indication;
sounding reference signal (SRS) request;
code block group (CBG) transmission information;
CBG flushing out information; and/or
demodulation reference signal (DMRS) sequence initialization.

Figure 5:
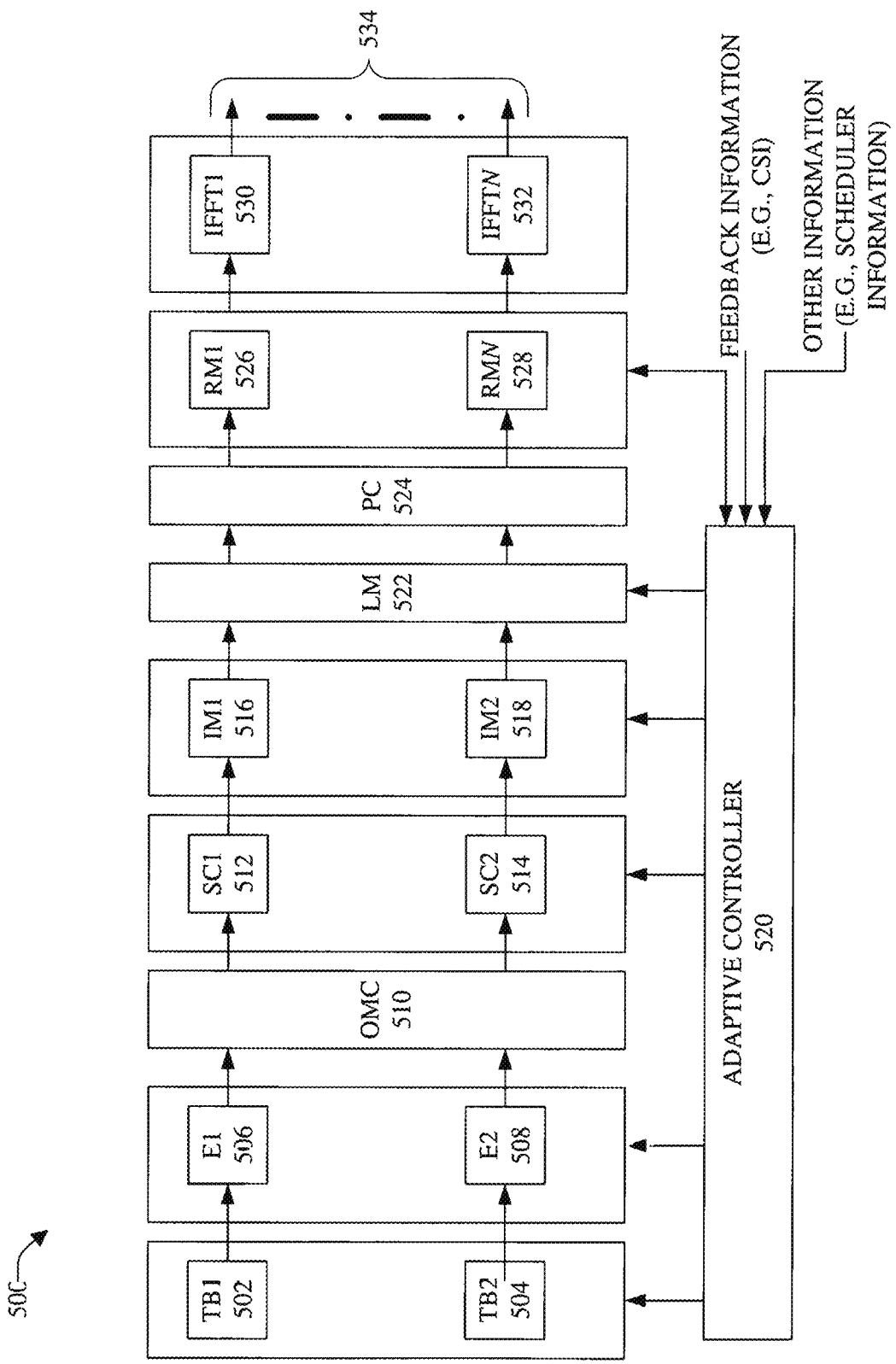
FIG. 5 depicts a block diagram of an example transmitter on the transmission side of a Multiple Input Multiple Output (MIMO) communications system with $N_t$ transmit antennas, in accordance with various aspects and embodiments of the disclosed subject matter.

Referring to FIG. 5, FIG. 5 depicts a block diagram of an example transmitter 500 on the transmission side of a MIMO communications system with $N_t$ transmit antennas, in accordance with various aspects and embodiments of the disclosed subject matter. This can illustrate, for example, the coding chain for PDSCH.

In the transmitter 500, there can be, for example, up to 2 transport blocks, such as transport block$_1$ 502 (TB1) and transport block$_2$ 504 (TB2), wherein the number of transport blocks can be equal to one when the number of layers is less than or equal to four. If the number of layers is more than four, two transport blocks can be transmitted by the transmitter 500. The cyclic redundancy check (CRC) bits can be added to each transport block and the respective data streams can be passed to the channel encoder(s), such as, for example, channel encoder$_1$ 506 (E1) and channel encoder$_2$ 508 (E2). In some embodiments, the respective channel encoders (e.g., 506, 508) can utilize low-density parity-check (LDPC) codes as the FEC for NR. The respective channel encoders (e.g., 506, 508) can add parity bits to the respective data streams to protect and facilitate error correction of the data.

In some embodiments, after the channel encoding is performed, the overhead management component 510 can determine which redundancy version state to utilize for the data transmission, determine the control channel format for the control channel, determine and/or generate the control information, and/or generate the control channel having the appropriate control channel format and appropriate control information, as more fully described herein.

After encoding and the determining of the redundancy version state and control channel format, the transmitter 500 can comprise one or more scrambler components, such as scrambler component$_1$ 512 (SC1) and scrambler component$_2$ 514 (SC2), and the respective data streams can be passed to the respective scrambler components, which can scramble the respective data streams with user specific scrambling.

After the scrambling has been performed, the transmitter 500 can pass the respective data streams through one or more respective interleaver and modulation components (e.g., interleaver and modulation component(s)), such as interleaver and modulation component$_1$ 516 (IM1) and interleaver and modulation component$_2$ 518 (IM2). The interleaver size of the respective interleaver and modulation components (e.g., 516, 518) can be adaptively controlled (e.g., by an adaptive controller 520) by puncturing to increase the data rate. The adaptive controller 520 can perform such adaptation of the interleaver size by using the information from the feedback channel, such as, for example, CSI and/or other information (e.g., scheduler information) sent by the receiver (e.g., the mobile device). The transmitter 500 can pass the interleaved data through one or more respective symbol mappers (modulators) of the respective interleaver and modulation components (e.g., 516, 518). The adaptive controller 520 also can control the respective symbol mappers, based at least in part on the information from the feedback channel. After the modulator(s), the transmitter 500 can pass the respective data streams through a layer mapper component 522 (LM) and a precoder component 524 (PC), which can perform respective operations on the respective data streams.

The transmitter 500 can comprise one or more re-mapper components, such as re-mapper component$_1$ 526 (RM1) and re-mapper component$_N$ 528 (RMN). The respective re-mapper components (e.g., 526, 528) can map the respective resultant symbols of the respective data streams output from the precoder component 524 to the resources elements in the time-frequency grid of OFDM.

The transmitter 500 can include one or more inverse fast Fourier transform (IFFT) components (e.g., IFFT blocks), such as IFFT component$_1$ 530 (IFFT1) and IFFT component$_N$ 532 (IFFTN), and the transmitter 500 can pass (e.g., communicate, or send) the resultant data streams, output from the respective re-mapper components (e.g., 526, 528), through the respective IFFT components (e.g., 530, 532). It is noted that an IFFT block can be desirable (e.g., suitable or necessary) for some communication systems which implement OFDMA as the access technology (e.g., 5G, LTE/LTE-A), and, in other systems, it may be different and can be dependent in part on the multiple access system. The transmitter 500 can comprise a set of antennas 534, comprising Nc antennas, and the encoded data stream can be transmitted through the respective antennas of the set of antennas 534, wherein N can be a desired integer number.

In some embodiments, code block segmentation can be employed to facilitate transmission of data. In NR, for data transmission, the transport block can be encoded using, for example, LDPC code, as disclosed herein. In a first act of the physical-layer processing, a 24-bit cyclic redundancy check (CRC) can be calculated (e.g., by the overhead management component 112 or another component of the network node device 102) for and appended to each transport block. The CRC can allow for receiver-side detection of errors in the decoded transport block. The corresponding error indication can, for example, be used by the downlink HARQ protocol as a trigger for requesting retransmissions.

Figure 6:
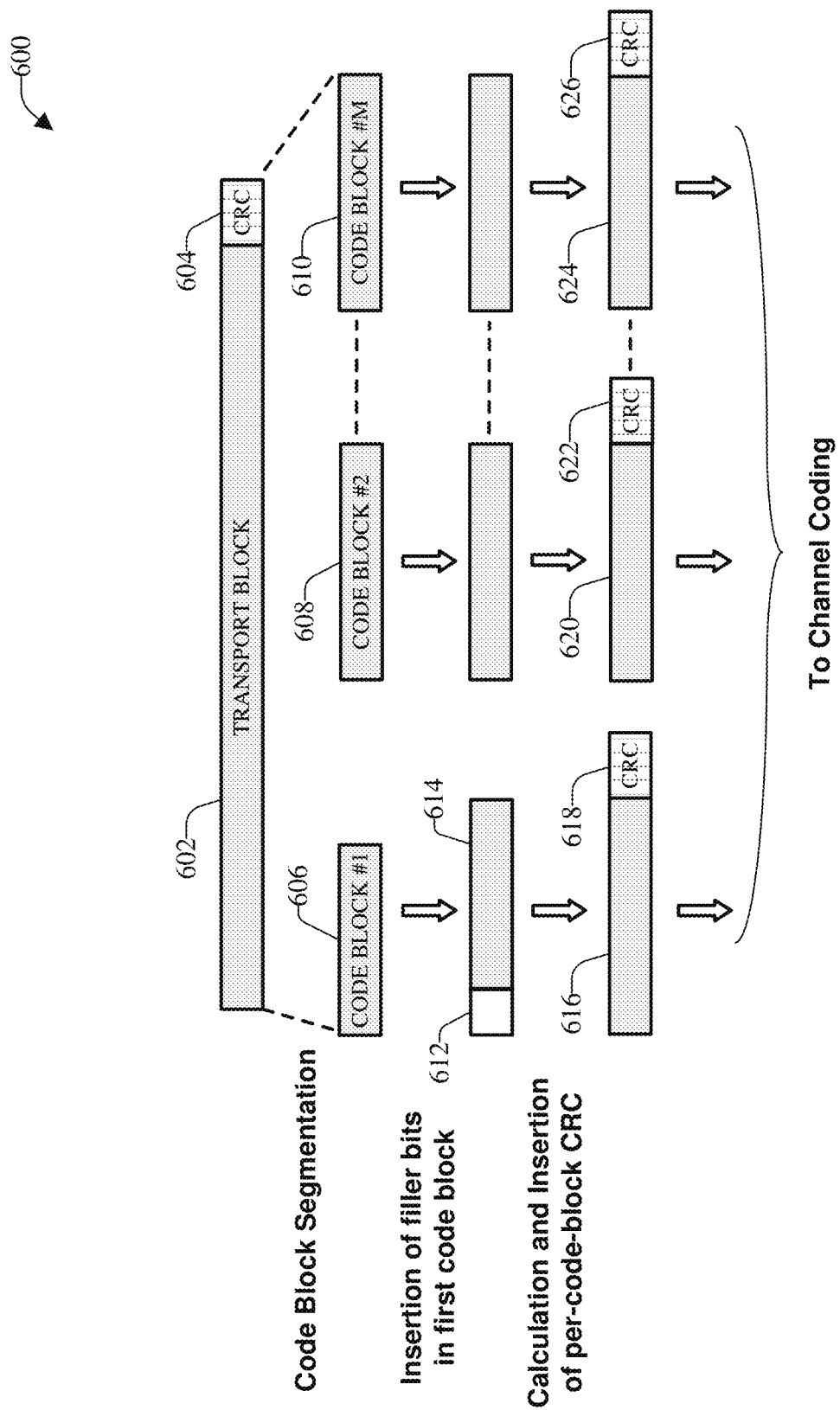
FIG. 6 illustrates a block diagram of an example code block segmentation, in accordance with various aspects and embodiments of the disclosed subject matter.

Turning to FIG. 6, FIG. 6 illustrates a block diagram of an example code block segmentation 600, in accordance with various aspects and embodiments of the disclosed subject matter. If the transport block, including the transport-block CRC, exceeds the maximum code-block size (e.g., 8448 for base graph 1, and 3840 for base graph 2, of Table 3, disclosed herein), code-block segmentation can be applied (e.g., by the overhead management component 112 or another component of the network node device 102) before the LDPC coding. Code-block segmentation can mean or imply that the transport block is segmented into smaller code blocks, the sizes of which should match or otherwise be in accordance with (e.g., compatible with) the set of code-block sizes supported by the encoder component (e.g., LDPC coder).

As illustrated in the example code block segmentation 600, a transport block 602 can comprise or have the CRC 604 appended to the transport block 602. In this example case, the transport block can be segmented (e.g., by the overhead management component 112 or another component of the network node device 102) into a desired number (e.g., M) of code blocks, comprising code block #1 606, code block #2 608, up through code block #M 610, in accordance with the set of code-block sizes supported by the encoder component, wherein M can be a desired integer number.

Filler bits 612 can be inserted (e.g., by the overhead management component 112 or another component of the network node device 102) into the code block #1 606 to generate code block #1 614. Respective CRC for the respective code blocks (e.g., 612, 608, 610) can be determined (e.g., determined or calculated by the overhead management component 112 or another component of the network node device 102), and inserted into or appended to the respective code blocks (e.g., by the overhead management component 112 or another component of the network node device 102) to generate code block #1 616 associated with CRC 618, code block #2 620 associated with CRC 622, up through code block #M 624 associated with CRC 626. The respective code blocks (e.g., 616, 620, 624) and respectively associated CRC (e.g., 618, 622, 626) can be passed to channel coding.

In the case of a single code block when no segmentation is needed, no additional code-block CRC is applied, code-block segmentation typically is applied, for example, to large transport blocks for which the relative extra overhead due to the additional transport block CRC is determined to be relatively and sufficiently (e.g., suitably, acceptably) small. Information regarding the transport-block size can be provided to the terminal (e.g., mobile device) as part of the scheduling assignment transmitted on the control channel (e.g., PDCCH control channel). Based at least in part on this information, the terminal (e.g., device 104) can determine the code-block size and number of code blocks. The terminal receiver can thus, based at least in part on the information provided in the scheduling assignment, straightforwardly undo or assemble the code-block segmentation and recover the decoded transport blocks.

Figure 7:
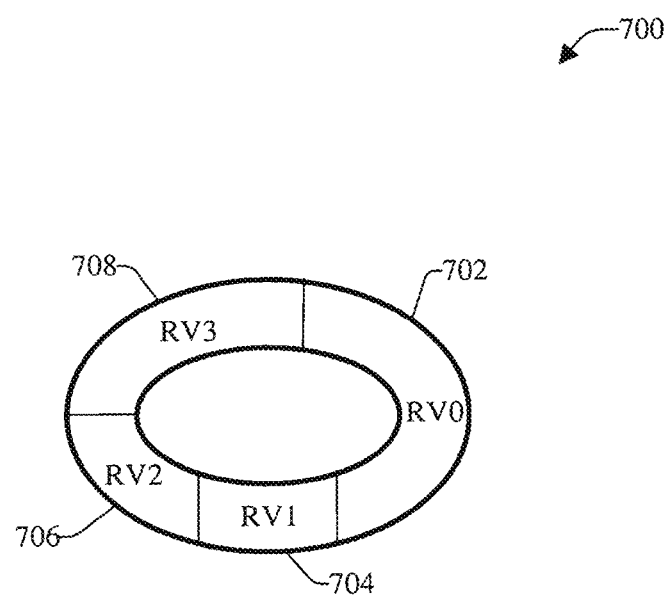
FIG. 7 illustrates a diagram of an example circular buffer comprising four redundancy versions, in accordance with various aspects and embodiments of the disclosed subject matter.

With regard to redundancy version, it is noted that, once the information bits are segmented and encoded using LDPC code (e.g., either base graph 1 or 2 of Table 3), it can be desirable (e.g., suitable or necessary) for the information bits to be rate matched for the transmission. In some embodiments, NR (e.g., an overhead management component in an NR system) can utilize a circular buffer for rate matching each code block. As an example, the standard can define four redundancy versions, as depicted in FIG. 7, which illustrates a diagram of an example circular buffer 700 comprising four redundancy versions, in accordance with various aspects and embodiments of the disclosed subject matter. The example circular buffer 700 can include, for example, four redundancy versions, such as RV0 702, RV1 704, RV2 706, and RV3 708.

The respective starting positions of each redundancy version can be, for example, as shown in Table 3. In Table 3, $N_{cb}$ can be or represent the number of information bits in a code block, and $Z_c$ can be, for example, a shifting size or parameter that shifts a matrix (e.g., parametric matrix) in the precoding.

TABLE 3

Starting position of different redundancy versions, $k_0$

| $RV_{id}$ | Base graph 1 | Base graph 2 |
|---|---|---|
| 0 | 0 | 0 |
| 1 | $\left\lfloor \frac{17N_{cb}}{66Z_c} \right\rfloor Z_c$ | $\left\lfloor \frac{13N_{cb}}{50Z_c} \right\rfloor Z_c$ |
| 2 | $\left\lfloor \frac{33N_{cb}}{66Z_c} \right\rfloor Z_c$ | $\left\lfloor \frac{25N_{cb}}{50Z_c} \right\rfloor Z_c$ |
| 3 | $\left\lfloor \frac{56N_{cb}}{66Z_c} \right\rfloor Z_c$ | $\left\lfloor \frac{43N_{cb}}{50Z_c} \right\rfloor Z_c$ |

In NR, for each transmission, it can be desirable (e.g., suitable or necessary) for the communication network (e.g., the network node device 102 of the communication network) to inform to the device (e.g., 104) which redundancy version of the four redundancy versions it is currently scheduling. This network node device (e.g., 102) can communicate desired information, such as information relating to redundancy version, via the downlink control channel for PDSCH transmission and downlink control channel (grant channel) for uplink data transmission.

To further illustrate aspects and embodiments of the disclosed subject matter, with further regard to control channel design, in a 5G system (or other next generation system), a single downlink control channel design can be inefficient and undesirable. Referring again to FIG. 2, FIG. 2 presents a block diagram of an example downlink control channel 200 that includes a redundancy version field and can be employed when utilizing the multiple redundancy versions state with respect to a codeword, in accordance with various aspects and embodiments of the disclosed subject matter. The downlink control channel 200 is a type of control channel that can be used, for example, when HARQ-incremental redundancy (HARQ-IR) is supported. With a single downlink control channel design, if the example downlink control channel 200, with its particular structure (e.g., format) is employed, such downlink control channel 200 can comprise an RV field and redundancy version (e.g., redundancy version value(s) or bits) for each codeword of the data transmission. It is noted that this downlink control channel structure is commonly used in 3G and 4G communication systems.

However, if, for example, a device (e.g., mobile device) is always scheduled with redundancy version of RV0, in each transmission, the contents of the downlink control channel representing redundancy version can be useless or unnecessary, as these fields of the downlink control channel 200 can be conveying redundant information (e.g., since the redundancy version is RV0 for each transmission). It is noted that scheduling RV0 for every (re)transmission also can be referred to as HARQ Chase combining (HARQ-CC). Hence, in these cases, instead of indicating redundancy version in each downlink control information (DCI), the disclosed subject matter, employing the overhead management component (e.g., 112) and techniques disclosed herein, can specify that the network node device (e.g., 102) and the device (e.g., 104) are in agreement to use a same redundancy version value (e.g., use RV0) for all transmissions (e.g., when in accordance with the defined overhead management criteria) or use a different redundancy version value (e.g., a different RV) for each transmission (e.g., when in accordance with the defined overhead management criteria), wherein, for example, the overhead management component 112 can inform the device 104 regarding the state of redundancy version for each transmission.

Referring again to FIG. 3, FIG. 3 presents a block diagram of an example downlink control channel 300 that does not include a redundancy version field or redundancy version information, with respect to codewords of a data transmission, and can be employed when utilizing the single redundancy version state, in accordance with various aspects and embodiments of the disclosed subject matter. It is noted that a difference between the downlink control channel 300 and the downlink control channel 200 is that the redundancy version and the RV field are not present in the downlink control channel 300 (e.g., the downlink control channel structure with respect to HARQ-Chase combining), while, with regard to the downlink control channel structure of the downlink control channel 200 of FIG. 2, the field for the redundancy version typically can comprise two bits or three bits for four or eight (re)transmissions, respectively.

It can be observed, from FIGS. 2 and 3, that for HARQ-CC, it can be desirable to not have redundancy version or the RV field in the downlink control channel, as redundancy version is not desirable (e.g., is not necessary), as in every (re)transmission, the same codeblock as that of the first transmission can be transmitted. However, with regard to HARQ-IR, different codeblocks may be transmitted. As a result, with regard to HARQ-IR, it can be desirable to have these codeblocks indicated by redundancy version in the downlink control channel.

Figure 8:
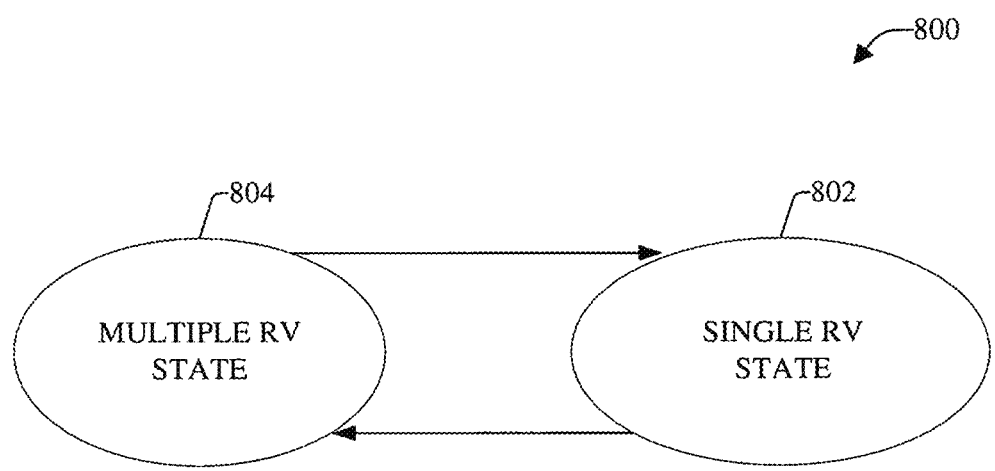
FIG. 8 presents an example state diagram that illustrates the respective states (e.g., respective redundancy version states) between which the communication network can switch to facilitate reducing overhead associated with a control channel in connection with data transmission, in accordance with various aspects and embodiments of the disclosed subject matter.

Thus, if the control channel structure associated with HARQ-CC is employed, as depicted in FIG. 3, it can be observed that the redundancy version fields are not particularly useful for the receiver (e.g., the device 104) and the redundancy version fields, and associated redundancy version information, can be undesirable additional overhead and does not convey any particularly useful information. Accordingly, the disclosed subject matter can employ a unified structure, using the techniques disclosed herein, to reduce the overhead of the control channel. Referring briefly to FIG. 8, FIG. 8 presents an example state diagram 800 that illustrates the respective states (e.g., respective redundancy version states) between which the communication network can switch to facilitate reducing overhead associated with a control channel in connection with data transmission, in accordance with various aspects and embodiments of the disclosed subject matter. The respective states can comprise, for example, a single redundancy version state 802 and a multiple redundancy versions state 804. In the single redundancy version state 802, in connection with a data transmission, the communication network (e.g., the overhead management component of the network) always can use a single redundancy version, such as RV0, which also can be referred to as CC. In the multiple redundancy versions state 804, in connection with a data transmission, the communication network (e.g., the overhead management component of the network) can select the same or different redundancy version for each (re)transmission.

In some embodiments, forward error correction (FEC)-1 can be the turbo code, and FEC-2 can be the quasi-cyclic LDPC (QC-LDPC) code. In other embodiments, FEC-1 can be the turbo code, and FEC-2 can be the Polar code. It is noted that CQI Table 1 and Table 2 differ in entries can mean the granularity at low code rates and high code rate entities.

Figure 9:
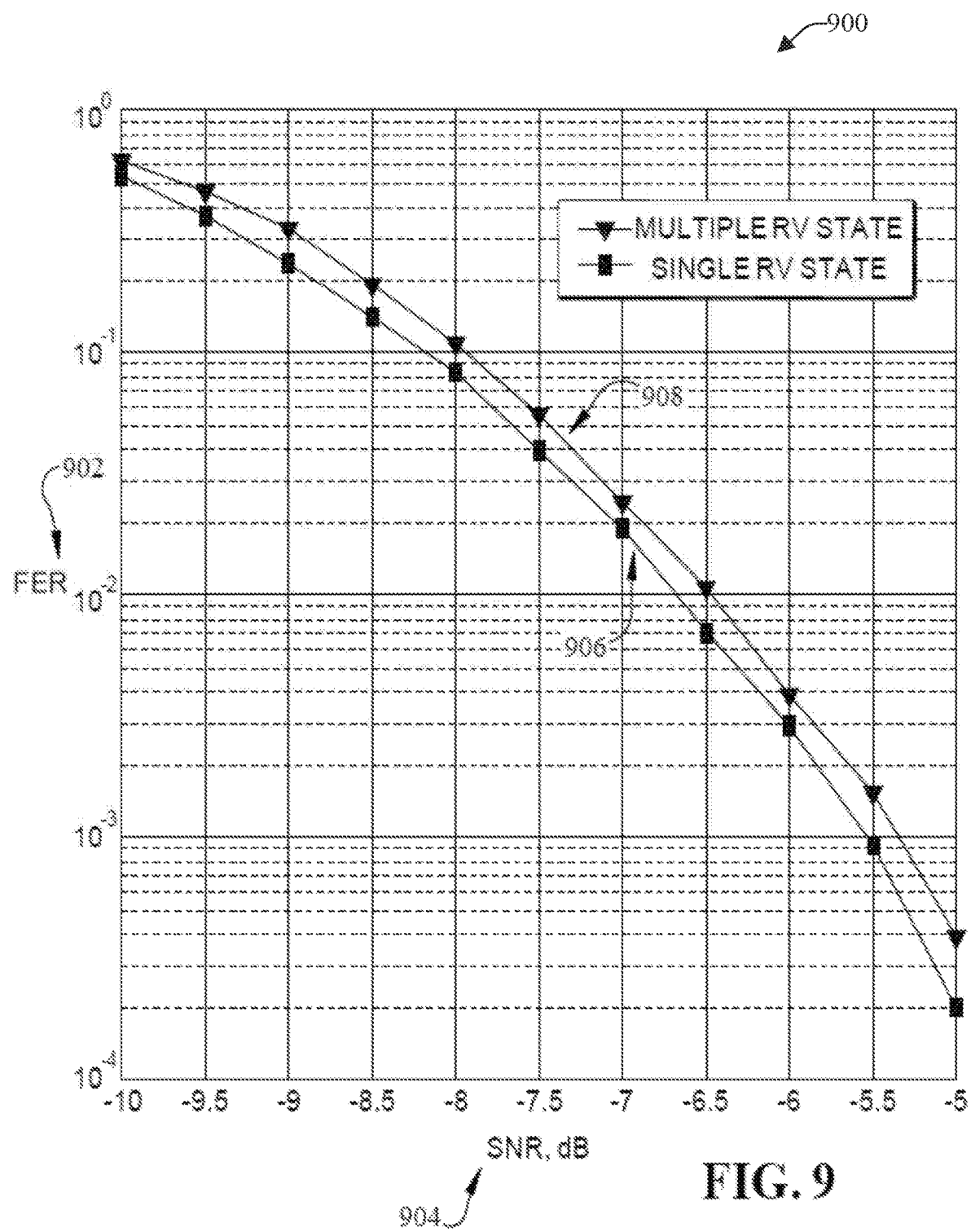
FIG. 9 presents a diagram of an example graph illustrating the frame error rate (FER) for DCI transmission using a multiple redundancy versions capable DCI and a single-state redundancy version DCI, in accordance with various aspects and embodiments of the disclosed subject matter.

FIG. 9 presents a diagram of an example graph 900 illustrating the frame error rate (FER) for DCI transmission using a multiple redundancy versions capable DCI and a single-state redundancy version DCI, in accordance with various aspects and embodiments of the disclosed subject matter. The graph 900 can illustrate the respective FER 902 (on they-axis) for DCI transmission with respect to the SNR 904 (on the x-axis) in dB for the respective redundancy version states (e.g., single redundancy version state and multiple redundancy versions state). As can be observed from the graph 900, the FER for DCI transmission with regard to the single redundancy version state (906) can be more desirable (e.g., better, more suitable, or improved), as compared to the FER for DCI transmission with regard to the multiple redundancy versions state (908). Thus, as can be observed from the graph 900, coverage can be improved using the techniques disclosed herein, wherein, for example, in instances where it can be desirable (e.g., appropriate, suitable, acceptable, or optimal), in accordance with the defined overhead management criteria, the single redundancy version state can be employed for DCI, and, in other instances where it can be desirable to employ multiple redundancy versions for the DCI, in accordance with the defined overhead management criteria, the multiple redundancy versions state can be employed for the DCI, in accordance with various aspects and embodiments of the disclosed subject matter.

Figure 10:
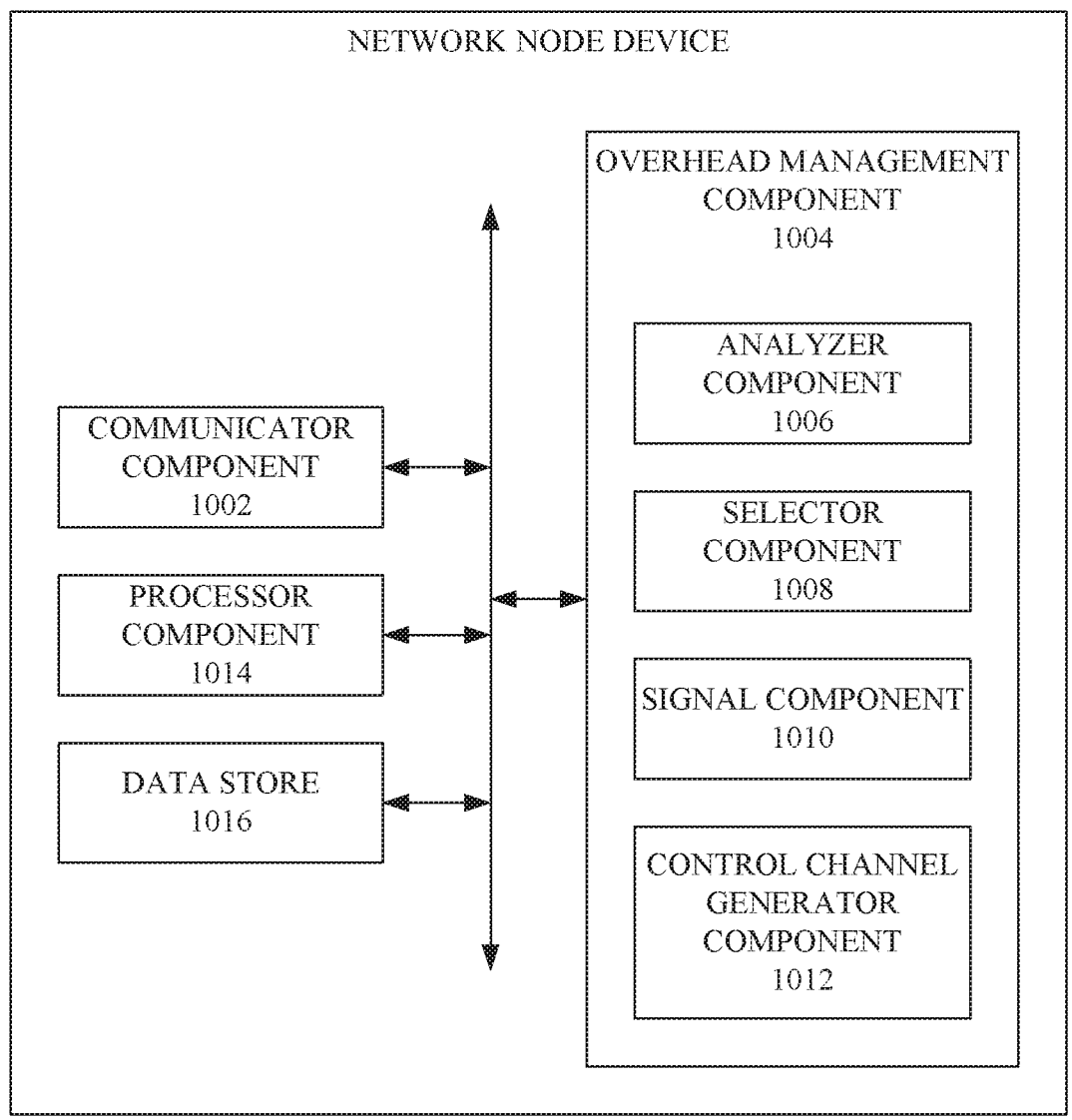
FIG. 10 illustrates an example, non-limiting network node device that can control and reduce overhead for a control channel in a communication network, in accordance with various aspects and embodiments of the disclosed subject matter.

FIG. 10 depicts an example, non-limiting network node device 1000 that can control and reduce overhead for a control channel in a communication network, in accordance with various aspects and embodiments of the disclosed subject matter. Repetitive description of like elements employed in other embodiments described herein is omitted for sake of brevity. The network node device 1000 can comprise a communicator component 1002, an overhead management component 1004, an analyzer component 1006, a selector component 1008, a signal component 1010, a control channel generator component 1012, a processor component 1014, and a data store 1016.

The communicator component 1002 can comprise a transmitter component and a receiver component. The transmitter component can be employed to transmit information from the network node device 1000 to another device (e.g., a mobile and/or communication device, another network node device). The transmitter component can comprise the components and functionality, such as described herein. The receiver component can be employed to receive information from another device (e.g., a mobile and/or communication device, another network node device). The receiver component can comprise various components for receiving the information, decoding received information, error correcting the received information, and/or performing other processing of the receive information.

The overhead management component 1004 can control and/or reduce the overhead, including, for example, the redundancy version information, for a control channel (e.g., downlink control channel, uplink control channel) in connection with a data transmission, in accordance with the defined overhead management criteria. The overhead management component 1004 can control performance of all or at least a portion of the operations of the various components of the network node device 1000. The overhead management component 1004 can determine which redundancy version state to utilize, a control channel format to utilize, and/or what control information to include in a control channel, in connection with a data transmission, as more fully described herein. The overhead management component 1004 also can determine which control signal (e.g., RRC signal) to communicate to a device (e.g., mobile device) and facilitate communicating the control signal to the device, in connection with the data transmission, as more fully described herein.

The analyzer component 1006 can analyze information, and can generate analysis results based at least in part on the results of the analysis of the information, to facilitate determining which redundancy version state to utilize, determining a control channel format to utilize, and/or determining what control information to include in a control channel, in connection with a data transmission. For instance, the analyzer component 1006 can analyze information relating to one or more characteristics, factors, or performance criteria associated with a device (e.g., mobile device) to facilitate determining whether to utilize the single redundancy version state or the multiple redundancy versions state, and correspondingly, facilitate determining whether to use the control channel format associated with the single redundancy version state or the control channel format associated with the multiple redundancy versions state, and/or determining whether to not include redundancy version information in the control channel information (e.g., for the single redundancy version state) or to include redundancy version information in the control channel information (e.g., for the multiple redundancy versions state), based at least in part on the analysis results, in accordance with the defined overhead management criteria.

The selector component 1008 can select the desired redundancy version state, and correspondingly, can select the desired control channel format and select the desired control information (e.g., which may or may not include redundancy version information), for use in connection with a data transmission, based at least in part on the analysis results obtained from the analyzer component 1006.

The signal component 1010 can determine and generate a desired control signal that corresponds to the selected redundancy version state for a data transmission. The signal component 1010 can facilitate communicating the desired control signal to the device via the communicator component 1002.

The control channel generator component 1012 can determine and generate desired control information, which may or may not include redundancy version information, depending in part on the redundancy version state that is selected. The control channel generator component 1012 also can determine a desired control channel format, and generate a control channel in accordance with the desired control channel format, based at least in part on the selected redundancy version state. The control channel information can be communicated via the control channel from the network node device 1000 to the device, in connection with the data transmission.

The processor component 1014 can work in conjunction with the other components (e.g., communicator component 1002, overhead management component 1004, data store 1016) to facilitate performing the various functions of the network node device 1000. The processor component 1014 can employ one or more processors, microprocessors, or controllers that can process data, such as information relating to characteristics, factors, or performance criteria associated with devices (e.g., mobile devices), redundancy version states, redundancy version information, control channels, control channel formats, control channel information, parameters relating to data communications, traffic flows, policies, defined overhead management criteria, algorithms (e.g., overhead management algorithm(s)), protocols, interfaces, tools, and/or other information, to facilitate operation of the network node device 1000, as more fully disclosed herein, and control data flow between the network node device 1000 and other components (e.g., mobile devices, other network devices of the communication network, data sources, applications, . . . ) associated with the network node device 1000.

The data store 1016 can store data structures (e.g., user data, metadata), code structure(s) (e.g., modules, objects, hashes, classes, procedures) or instructions, information relating to characteristics, factors, or performance criteria associated with devices (e.g., mobile devices), redundancy version states, redundancy version information, control channels, control channel formats, control channel information, parameters relating to data communications, traffic flows, policies, defined overhead management criteria, algorithms (e.g., overhead management algorithm(s)), protocols, interfaces, tools, and/or other information, to facilitate controlling operations associated with the network node device 1000. In an aspect, the processor component 1014 can be functionally coupled (e.g., through a memory bus) to the data store 1016 in order to store and retrieve information desired to operate and/or confer functionality, at least in part, to the communicator component 1002, overhead management component 1004, etc., and/or substantially any other operational aspects of the network node device 1000.

It should be appreciated that the data store 1016 described herein can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 11:
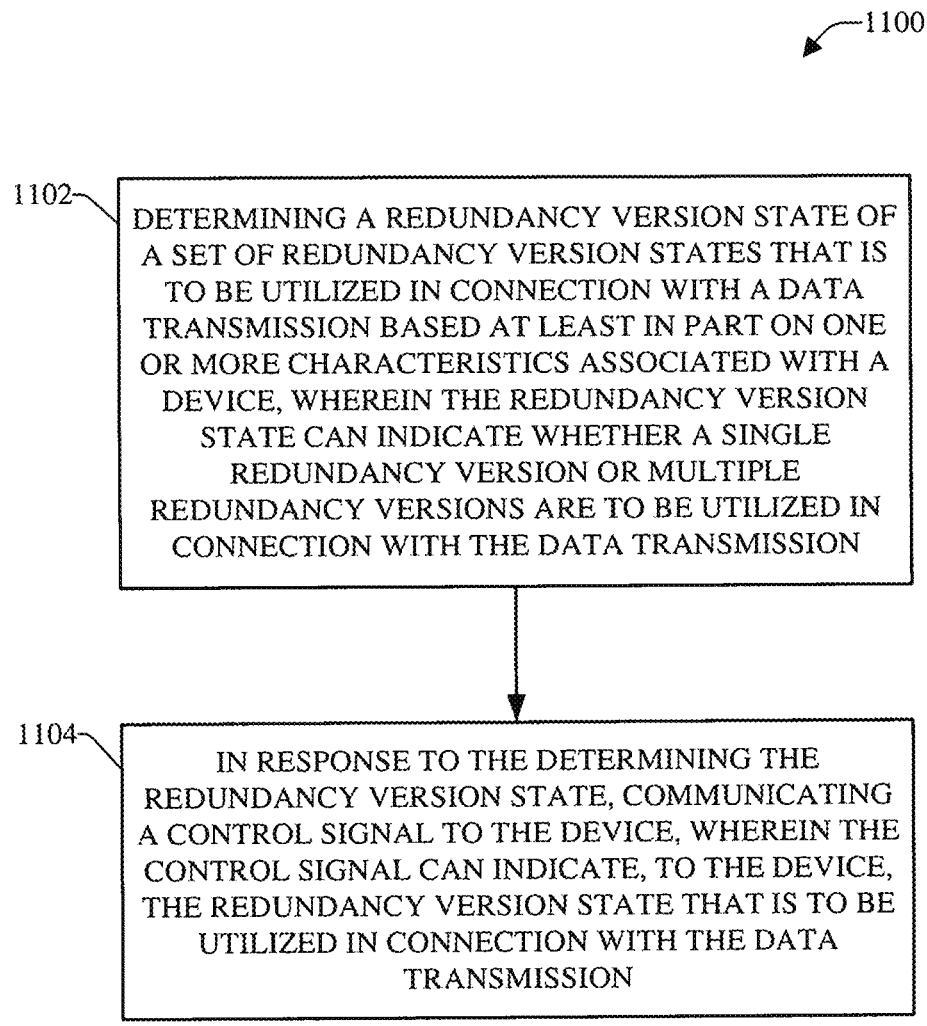
FIG. 11 illustrates an example, non-limiting method for controlling overhead for a control channel in a communication network, in accordance with various aspects and embodiments of the disclosed subject matter.
Figure 12:
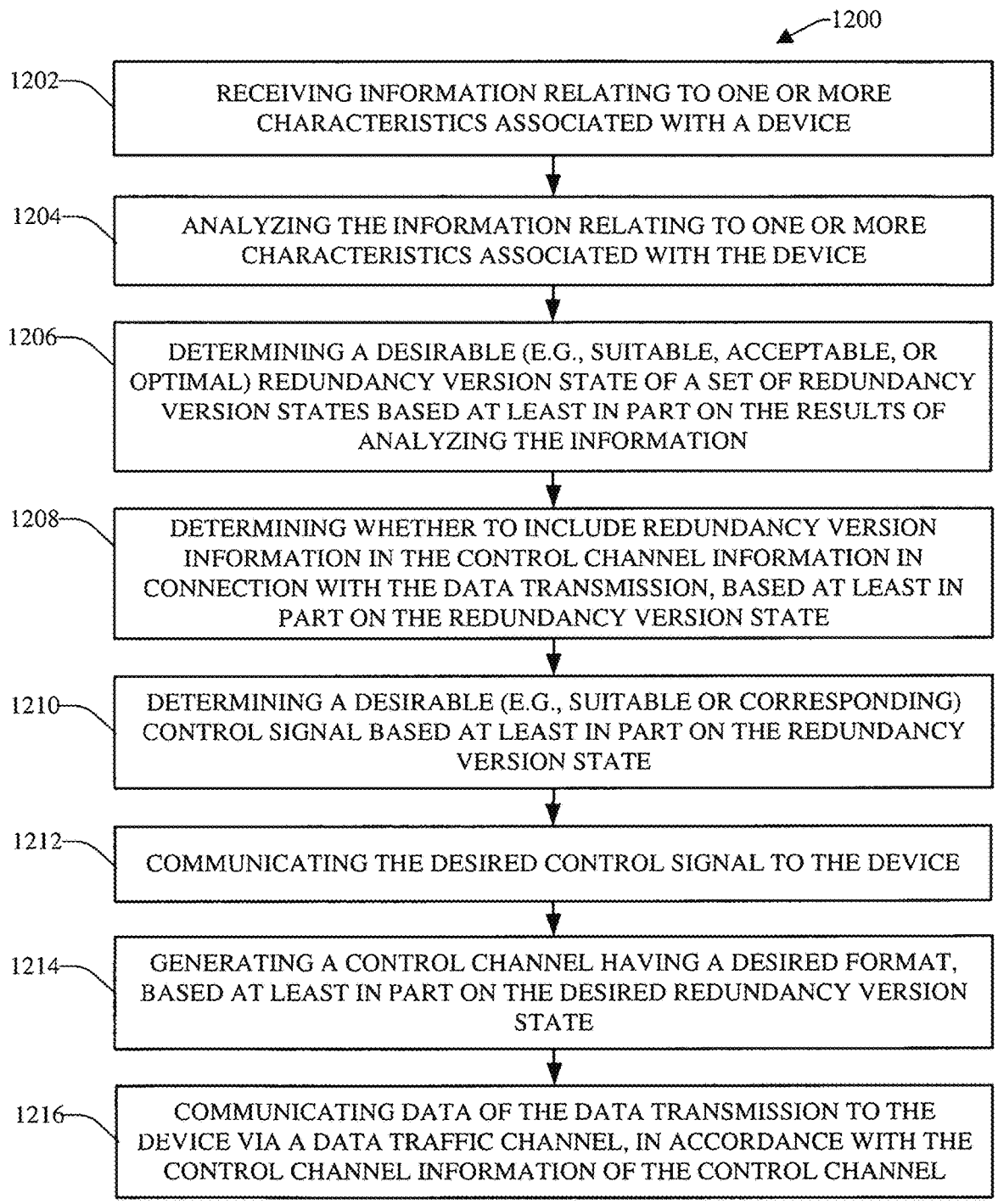
FIG. 12 illustrates another example, non-limiting method for controlling overhead for a control channel in a communication network, in accordance with various aspects and embodiments of the disclosed subject matter.

In view of the example systems and/or devices described herein, example methods that can be implemented in accordance with the disclosed subject matter can be further appreciated with reference to flowcharts in FIGS. 11-12. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 11 illustrates an example, non-limiting method 1100 for controlling overhead for a control channel in a communication network, in accordance with various aspects and embodiments of the disclosed subject matter. The method 1100 can be implemented by a network node device of a wireless network, the network device comprising a processor, a memory, and/or an overhead management component. Alternatively, or additionally, a machine-readable storage medium can comprise executable instructions that, when executed by a processor, facilitate performance of operations for the method 1100.

At 1102, a redundancy version state of a set of redundancy version states that is to be utilized in connection with a data transmission can be determined based at least in part on one or more characteristics associated with a device, wherein the redundancy version state can indicate whether a single redundancy version or multiple redundancy versions are to be utilized in connection with the data transmission. For instance, the processor and/or overhead management component can analyze one or more characteristics, and can determine a redundancy version state of a set (e.g., group) of redundancy version states that is to be utilized in connection with a data transmission based at least in part on the results of analyzing the one or more characteristics associated with a device (e.g., mobile device).

The set of redundancy version states can comprise, for example, a single redundancy version state and a multiple redundancy versions state. The characteristics associated with the device can comprise, for example, a speed metric of the device, a Doppler metric of the device, a type of service associated with the device, historical HARQ statistics, a configured threshold for CSI estimation, a device capability for supporting a single redundancy version or multiple redundancy versions, and/or other characteristics, factors, or performance criteria, as more fully disclosed herein.

At 1104, in response to the determining the redundancy version state, a control signal can be communicated to the device, wherein the control signal can indicate, to the device, the redundancy version state that is to be utilized in connection with the data transmission. In response to the determining the redundancy version state, the processor and/or overhead management component can determine a desired (e.g., appropriate, corresponding) control signal (e.g., RRC signal) that can be employed to inform the device which redundancy version state has been determined and selected for the data transmission, and correspondingly, which control channel format will be used in connection with the data transmission, and whether redundancy version information will be included in the control channel information. The processor and/or overhead management component can communicate or facilitate communicating the desired control signal to the device.

The device (e.g., a communication management component of the device) can analyze the control signal. Based at least in part on the results of analyzing the control signal, the device can determine which redundancy version state has been selected for the data transmission, and correspondingly, which control channel format will be used in connection with the data transmission, and whether redundancy version information will be included in the control channel information.

FIG. 12 illustrates another example, non-limiting method 1200 for controlling overhead for a control channel in a communication network, in accordance with various aspects and embodiments of the disclosed subject matter. The method 1200 can be implemented by a network node device of a wireless network, the network device comprising a processor, a memory, and/or an overhead management component. Alternatively, or additionally, a machine-readable storage medium can comprise executable instructions that, when executed by a processor, facilitate performance of operations for the method 1200.

At 1202, information relating to one or more characteristics associated with a device can be received. The processor and/or overhead management component can receive the information relating to one or more characteristics associated with the device from the device, another network node, sensors, and/or another data source. The characteristics associated with the device can include, for example, a speed metric of the device, a Doppler metric of the device, a type of service associated with the device, historical HARQ statistics, a configured threshold for CSI estimation, a device capability for supporting a single redundancy version or multiple redundancy versions, and/or other characteristics, factors, or performance criteria, as more fully disclosed herein.

At 1204, the information relating to one or more characteristics associated with the device can be analyzed. The processor and/or overhead management component can analyze the information relating to one or more characteristics associated with the device to facilitate determining a desirable redundancy version state to employ in connection with a data transmission associated with the device.

At 1206, a desirable (e.g., suitable, acceptable, or optimal) redundancy version state of a set of redundancy version states can be determined based at least in part on the results of analyzing the information relating to one or more characteristics associated with the device, in accordance with the defined overhead management criteria. The processor and/or overhead management component can determine the desirable redundancy version state of the set of redundancy version states based at least in part on the analysis results. The set of redundancy version states can comprise, for example, a single redundancy version state and a multiple redundancy versions state.

At 1208, it can be determined whether to include redundancy version information in the control channel information in connection with the data transmission, based at least in part on the redundancy version state. The processor and/or overhead management component can determine whether to include redundancy version information in the control channel information in connection with the data transmission, based at least in part on the redundancy version state. For instance, if the desirable redundancy version state is the single redundancy version state, the processor and/or overhead management component can determine that no redundancy version information is to be included in the control channel. If, however, the desirable redundancy version state is the multiple redundancy versions state, the processor and/or overhead management component can determine that redundancy version information is to be included in the control channel.

At 1210, a desirable (e.g., suitable or corresponding) control signal can be determined based at least in part on the redundancy version state. The processor and/or overhead management component can determine the desirable control signal based at least in part on the redundancy version state. For example, if the desirable redundancy version state is the single redundancy version state, the processor and/or overhead management component can determine that a first type (e.g., single RV) of control signal is to be utilized to inform the device that the single redundancy version state has been selected in connection with the data transmission. If, however, the desirable redundancy version state is the multiple redundancy versions state, the processor and/or overhead management component can determine that a second type (e.g., multiple RV) of control signal is to be utilized to inform the device that the multiple redundancy versions state has been selected in connection with the data transmission. The control signal can be an RRC signal, for example.

At 1212, the desired control signal can be communicated to the device. The processor and/or overhead management component can communicate or facilitate communicating the desired control signal to the device.

At 1214, a control channel having a desired format can be generated, based at least in part on the desired redundancy version state. The processor and/or overhead management component can generate the control channel having the desired format, based at least in part on the desired redundancy version state. If the desired redundancy version state is the single redundancy version state, the processor and/or overhead management component can generate a control channel having a first format that does not include an RV field or redundancy version information. If, however, the desired redundancy version state is the multiple redundancy versions state, the processor and/or overhead management component can generate a control channel having a second format that does comprise an RV field into which redundancy version information can be inserted.

At 1216, data of the data transmission can be communicated to the device via a data traffic channel, in accordance with the control channel information of the control channel. The network node device can communicate the data of the data transmission to the device via the data traffic channel, in accordance with the control channel information of the control channel.

Described herein are systems, methods, articles of manufacture, and other embodiments or implementations that can facilitate controlling or reducing overhead for control channels in connection with data transmissions for a 5G, or other next generation, network. Facilitating controlling or reducing overhead for control channels in connection with data transmissions for a 5G, or other next generation, network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 13:
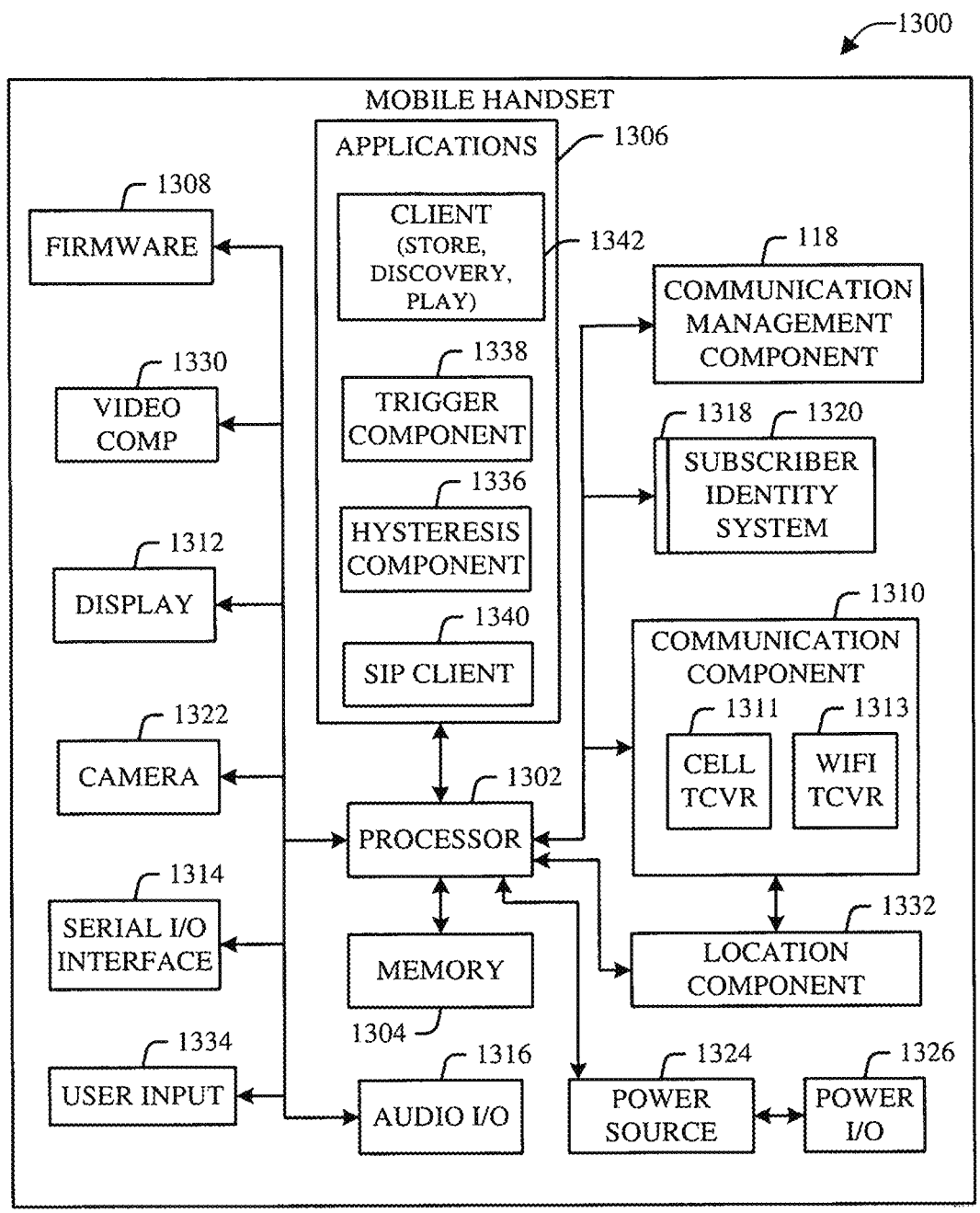
FIG. 13 illustrates an example block diagram of an example mobile handset operable to engage in a system architecture that facilitates wireless communications according to one or more embodiments described herein.

Referring now to FIG. 13, illustrated is an example block diagram of an example mobile handset 1300 (e.g., mobile device) operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communication component 1310 interfaces to the processor 1302 to facilitate wired/wireless communication with external systems, e.g., cellular networks, VoIP networks, and so on. Here, the communication component 1310 can also include a suitable cellular transceiver 1311 (e.g., a GSM transceiver) and/or an unlicensed transceiver 1313 (e.g., Wi-Fi, WiMax) for corresponding signal communications.

The handset 1300 can be a device such as a cellular telephone, a PDA with mobile communications capabilities, and messaging-centric devices. The communication component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communication component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or a decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communication component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

In some embodiments, the handset 1300 can comprise a communication management component 118 that can analyze a control signal (e.g., RRC signal) received from a network node device to determine which redundancy version state of a set of redundancy version states is being utilized in connection with a data transmission, and correspondingly, determine which control channel format is being employed or is to be employed for a control channel in connection with the data transmission, and determine whether the control channel will include an RV field and redundancy version information in connection with the data transmission, as more fully described herein.

Figure 14:
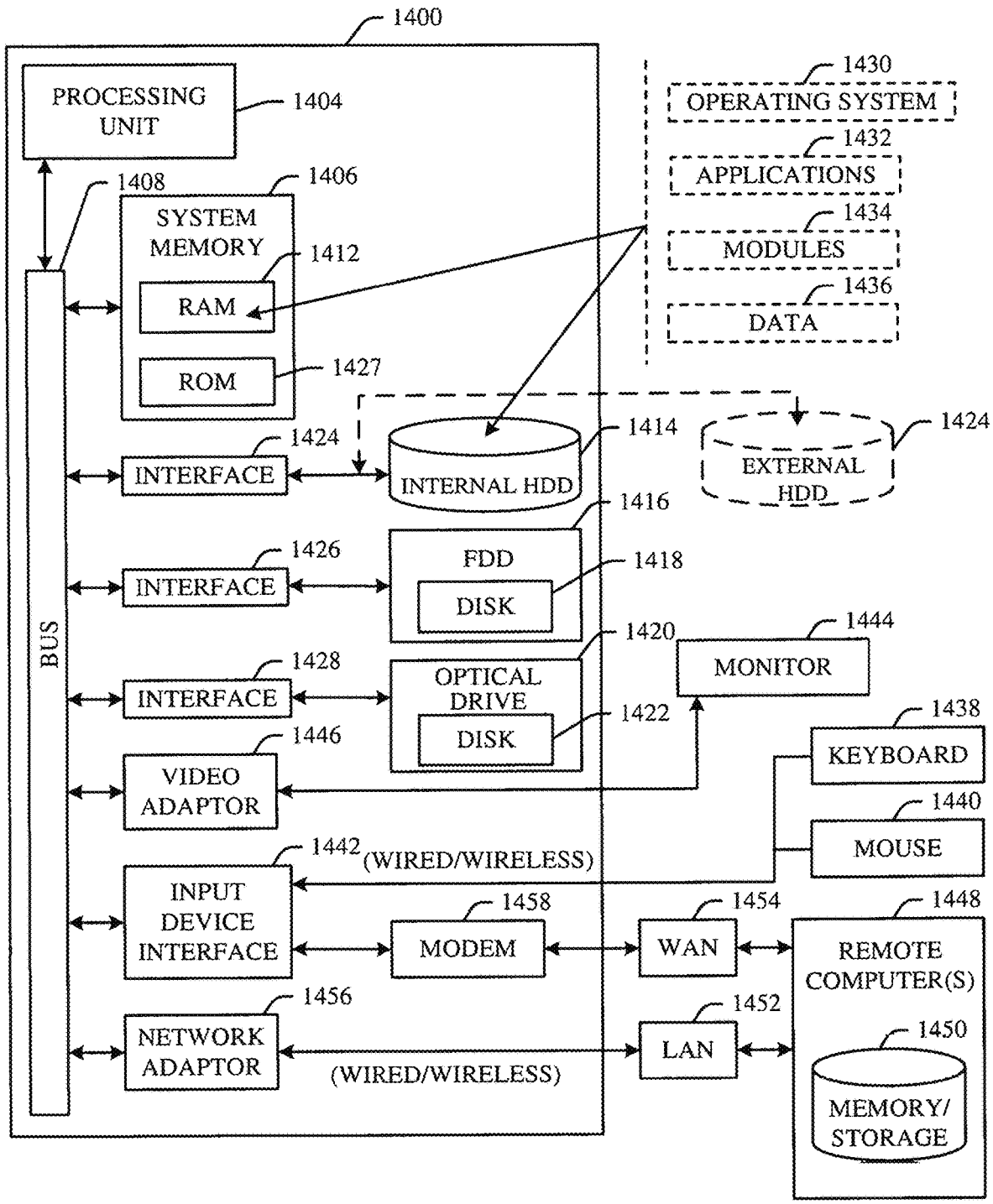
FIG. 14 illustrates an example block diagram of an example computer operable to engage in a system architecture that facilitates wireless communications according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server (e.g., Microsoft server) and/or communication device. In order to provide additional context for various aspects thereof, FIG. 14 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that can be linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 14, implementing various aspects described herein with regards to the end-user device can include a computer 1400, the computer 1400 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1427 and random access memory (RAM) 1412. A basic input/output system (BIOS) is stored in a non-volatile memory 1427 such as ROM, EPROM, EEPROM, which BIOS contains the basic routines that help to transfer information between elements within the computer 1400, such as during start-up. The RAM 1412 can also include a high-speed RAM such as static RAM for caching data.

The computer 1400 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1400 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1400, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the innovation can be implemented with various commercially available operating systems or combinations of operating systems.

A user can enter commands and information into the computer 1400 through one or more wired/wireless input devices, e.g., a keyboard 1438 and a pointing device, such as a mouse 1440. Other input devices (not shown) can include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 through an interface, such as a video adapter 1446. In addition to the monitor 1444, a computer 1400 typically includes other peripheral output devices (not shown), such as speakers, printers, etc.

The computer 1400 can operate in a networked environment using logical connections by wired and/or wireless communications to one or more remote computers, such as a remote computer(s) 1448. The remote computer(s) 1448 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1400 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1400 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 through the input device interface 1442. In a networked environment, program modules depicted relative to the computer, or portions thereof, can be stored in the remote memory/storage device 1450. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11 b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
 a processor; and
 a memory that stores executable instructions that, when executed by the processor, facilitate performance of operations, comprising:
  determining a redundancy version state of redundancy version states that is to be utilized in connection with a data transmission based on a characteristic associated with a device, wherein the characteristic comprises a speed metric that relates to a data transmission pass rate associated with the device, wherein the redundancy version state indicates a number of redundancy versions to utilize in connection with the data transmission, and wherein the data transmission pass rate indicates an amount of data packets that successfully pass in a first transmission of a group of data packets; and
  in response to the determining the redundancy version state, communicating a radio resource control message to the device, wherein the radio resource control message indicates, to the device, the redundancy version state that is to be utilized in connection with the data transmission.

2. The system of claim 1, wherein the redundancy version states comprises a single redundancy version state and a multiple redundancy versions state, wherein the single redundancy version state is associated with utilization of a single redundancy version in connection with the data transmission, and wherein the multiple redundancy versions state is associated with utilization of multiple redundancy versions in connection with the data transmission.

3. The system of claim 2, wherein the multiple redundancy versions state is associated with four redundancy versions.

4. The system of claim 2, wherein the number of redundancy versions to utilize in connection with the data transmission is a first number of redundancy versions, wherein the determining the redundancy version state of the redundancy version states comprises determining the redundancy version state of the redundancy version states that is to be utilized in connection with the data transmission based on at least one characteristic of characteristics associated with the device, wherein the at least one characteristic comprises the characteristic, and wherein the characteristics comprise the speed metric of the device, a Doppler metric of the device, a type of service associated with the device, historical hybrid-automatic-repeat-request data associated with the device, a threshold value to be employed with respect to an estimation of channel state information associated with the device, and a capability of the device relating to a second number of redundancy versions supported by the device.

5. The system of claim 4, wherein the type of service associated with the device is one of types of services that are supported by the device, and wherein the types of services comprise an enhanced mobile broadband service, an ultra reliable low latency communication service, and a massive machine type of communication service.

6. The system of claim 1, wherein the amount of data packets is a first amount of data packets, and wherein the redundancy version state is a single redundancy version state associated with utilization of a single redundancy version in connection with the data transmission to facilitate a reduction in a second amount of control information communicated via a control channel associated with the device in connection with the data transmission.

7. The system of claim 6, wherein, in accordance with the single redundancy version state, a redundancy version value is not included in the control information communicated via the control channel to the device to reduce the second amount of the control information communicated via the control channel.

8. The system of claim 6, wherein the data transmission comprises one or more transmissions of data between the device and a network device of a communication network, and wherein, in accordance with the single redundancy version state, a defined redundancy version value of the single redundancy version is utilized in connection with all of the one or more transmissions of data.

9. The system of claim 1, wherein the data transmission is an uplink transmission or a downlink data transmission between the device and a network node device of a communication network.

10. The system of claim 1, wherein the operations further comprise:
determining the speed metric associated with the device based on a first result of analyzing speed-related information relating to communicating data packets via a wireless communication channel associated with the device, wherein the speed-related information is indicative of the data transmission pass rate associated with the communicating of the data packets via the wireless communication channel; and
determining whether the speed metric satisfies a defined performance criterion relating to an amount of variance of a speed associated with the device or a Doppler metric associated with the wireless communication channel, wherein the determining the redundancy version state of the redundancy version states that is to be utilized in connection with the data transmission comprises determining the redundancy version state of the redundancy version states that is to be utilized in connection with the data transmission based on a second result of the determining whether the speed metric satisfies the defined performance criterion.

11. A method, comprising:
determining, by a system comprising a processor, a redundancy version state of a first group of redundancy version states that is to be utilized in connection with a data transmission based on a characteristic associated with a device, wherein the characteristic comprises a Doppler metric that relates to a data transmission pass rate associated with the device, wherein the redundancy version state indicates a number of redundancy versions to utilize in connection with the data transmission, and wherein the data transmission pass rate indicates an amount of items of data that pass in an initial transmission of a second group of items of data; and
in response to the determining the redundancy version state, transmitting, by the system, a control message to the device, wherein the control message indicates, to the device, the redundancy version state that is to be utilized in connection with the data transmission.

12. The method of claim 11, wherein the first group of redundancy version states comprises a single redundancy version state and a multiple redundancy versions state, wherein the single redundancy version state is associated with utilization of a single redundancy version in connection with the data transmission, and wherein the multiple redundancy versions state is associated with utilization of multiple redundancy versions in connection with the data transmission.

13. The method of claim 11, wherein the determining the redundancy version state of the first group of redundancy version states comprises determining the redundancy version state of the first group of redundancy version states that is to be utilized in connection with the data transmission based on at least one characteristic of characteristics associated with the device, wherein the at least one characteristic comprises the characteristic, and wherein the characteristics comprise a speed metric of the device, the Doppler metric of the device, a type of service associated with the device, historical hybrid-automatic-repeat-request data associated with the device, a threshold value to be employed with respect to an estimation of channel state information associated with the device, and a capability of the device relating to redundancy version support of the device.

14. The method of claim 11, wherein the amount of items of data is a first amount of items of data, and wherein the redundancy version state is a single redundancy version state associated with utilization of a single redundancy version in connection with the data transmission to facilitate a reduction in a second amount of control data communicated via a control channel associated with the device in connection with the data transmission.

15. The method of claim 14, wherein, in accordance with the single redundancy version state, redundancy version data is not included in the control data communicated via the control channel to the device to reduce the second amount of the control data communicated via the control channel.

16. The method of claim 11, wherein the data transmission is a downlink data transmission to the device, and wherein the method further comprises:
determining, by the system, control data associated with the data transmission based on the redundancy version state, wherein the determining the control data further comprises determining whether to include redundancy version data in the control data based on the redundancy version state;
communicating, by the system, the control data to the device via a downlink control channel; and
communicating, by the system, data of the data transmission to the device via a downlink data traffic channel.

17. The method of claim 11, wherein the data transmission is an uplink data transmission from the device, and wherein the method further comprises:
determining, by the system, control data associated with the data transmission based on the redundancy version state, wherein the determining the control data further comprises determining whether to include redundancy version data in the control data based on the redundancy version state;
communicating, by the system, the control data to the device via a downlink control channel; and
receiving, by the system, data of the data transmission from the device via an uplink data traffic channel.

18. The method of claim 11, wherein the control message is a radio resource control message.

19. A machine-readable storage medium, comprising executable instructions that, when executed by a processor, facilitate performance of operations, the operations comprising:
determining a redundancy version state of redundancy version states that is to be utilized in connection with a data transmission based on a factor associated with a device, wherein the factor comprises a speed metric that relates to a data transmission pass rate associated with the device, wherein the redundancy version state indicates a number of redundancy versions to utilize in connection with the data transmission, and wherein the data transmission pass rate corresponds to an amount of data packets that pass in a first transmission of a group of data packets;
determining a radio resource control signal that corresponds to the redundancy version state; and
transmitting the radio resource control signal to the device, wherein the radio resource control signal indicates, to the device, the redundancy version state that is to be utilized in connection with the data transmission.

20. The machine-readable storage medium of claim 19, wherein the determining the redundancy version state of the redundancy version states comprises determining the redundancy version state of the redundancy version states that is to be utilized in connection with the data transmission based on at least one factor of factors associated with the device,
- wherein the at least one factor comprises the factor,
    - wherein the factors comprise the speed metric of the device, a Doppler metric of the device, a type of service associated with the device, historical hybrid-automatic-repeat-request data associated with the device, a threshold value to be employed with respect to an estimation of channel state information associated with the device, and a capability of the device relating to redundancy version support of the device,
- wherein the type of service associated with the device is one of types of services that are supported by the device, and
- wherein the types of services comprise an enhanced mobile broadband service, an ultra reliable low latency communication service, and a massive machine type of communication service.

\* \* \* \* \*